(12) United States Patent
Goto et al.

(10) Patent No.: US 8,382,271 B2
(45) Date of Patent: Feb. 26, 2013

(54) INKJET INK, INK CARTRIDGE, INKJET RECORDING APPARATUS, INKJET RECORDING METHOD AND IMAGE FORMING APPARATUS

(75) Inventors: Hiroshi Goto, Kanagawa (JP); Yukitaka Watarai, Miyagi (JP); Koji Katsuragi, Miyagi (JP); Hidefumi Nagashima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 164 days.

(21) Appl. No.: 13/062,232

(22) PCT Filed: Sep. 2, 2009

(86) PCT No.: PCT/JP2009/065621
§ 371 (c)(1),
(2), (4) Date: Mar. 4, 2001

(87) PCT Pub. No.: WO2010/027078
PCT Pub. Date: Mar. 11, 2010

(65) Prior Publication Data
US 2011/0164086 A1    Jul. 7, 2011

(30) Foreign Application Priority Data

Sep. 5, 2008  (JP) ................................ 2008-228170
Jan. 6, 2009  (JP) ................................ 2009-001145

(51) Int. Cl.
*B41J 2/17*   (2006.01)
*C09D 11/02*  (2006.01)
(52) U.S. Cl. .................................... 347/100; 106/31.27
(58) Field of Classification Search ............... 347/43, 347/95, 100; 106/31.26, 31.27, 31.6
See application file for complete search history.

(56) References Cited

U.S. PATENT DOCUMENTS 7,320,727 B2 *   1/2008   Jou et al. ..................... 106/31.13
7,396,397 B2 *   7/2008   Kanbayashi ............... 106/31.27
8,192,009 B2 *   6/2012   Yokohama et al. ........... 347/100
(Continued)

FOREIGN PATENT DOCUMENTS

JP   2001 199151   7/2001
JP   2002 337449   11/2002
(Continued)

OTHER PUBLICATIONS

International Search Report issued Dec. 28, 2009 in PCT/JP09/065621 filed Sep. 2, 2009.

*Primary Examiner* — Lammson Nguyen
(74) *Attorney, Agent, or Firm* — Oblon, Spivak, McClelland, Maier & Neustadt, L.L.P.

(57) ABSTRACT

The present invention provides an inkjet ink which is excellent in image quality and high-speed printing on plain paper, in storage stability and in ejection stability and gives less load on a maintenance device for an inkjet recording apparatus; and an ink cartridge, an inkjet recording apparatus, and an inkjet recording method, using the inkjet ink. An inkjet ink containing a water dispersion of pigment-containing water-insoluble vinyl polymer particles; a water-soluble organic solvent; and water, wherein an ink residue from the inkjet ink has a viscosity of 3,000 mPa·s or less, the ink residue is obtained by leaving the inkjet ink to stand at a temperature of 25° C. and a humidity of 15% until substantially no mass change occurs, and wherein the inkjet ink, pH of which is adjusted to 7 with an acid, has a viscosity of 500 mPa·s or more.

13 Claims, 6 Drawing Sheets

U.S. PATENT DOCUMENTS

| | | |
|---|---|---|
| 8,231,722 B2 * | 7/2012 | Uozumi et al. ............ 106/31.26 |
| 2007/0144399 A1 | 6/2007 | Nagashima et al. |
| 2007/0197685 A1 | 8/2007 | Aruga et al. |
| 2008/0233363 A1 | 9/2008 | Goto |
| 2009/0043028 A1 | 2/2009 | Matsuyama et al. |
| 2009/0098312 A1 | 4/2009 | Goto et al. |
| 2009/0176070 A1 | 7/2009 | Goto et al. |
| 2010/0196601 A1 | 8/2010 | Goto et al. |

FOREIGN PATENT DOCUMENTS

| | | |
|---|---|---|
| JP | 2002 338783 | 11/2002 |
| JP | 2003 206420 | 7/2003 |
| JP | 2003 220698 | 8/2003 |
| JP | 3603311 | 12/2004 |
| JP | 2005 36203 | 2/2005 |
| JP | 2005 42005 | 2/2005 |
| JP | 2006 16412 | 1/2006 |
| JP | 3780162 | 5/2006 |
| JP | 2006 249393 | 9/2006 |
| JP | 3915436 | 5/2007 |
| JP | 2007 197658 | 8/2007 |
| JP | 2007 262205 | 10/2007 |
| JP | 4053516 | 2/2008 |
| JP | 2008 74937 | 4/2008 |
| JP | 2008 184567 | 8/2008 |
| WO | 00 06390 | 2/2000 |

* cited by examiner

INKJET INK, INK CARTRIDGE, INKJET RECORDING APPARATUS, INKJET RECORDING METHOD AND IMAGE FORMING APPARATUS

TECHNICAL FIELD

The present invention relates to an inkjet ink, an ink cartridge, an inkjet recording apparatus, an inkjet recording method, and an image forming method. Specifically, an inkjet ink which is excellent in image quality and high-speed printing on plain paper, in storage stability and in ejection stability and gives less load on a maintenance device for an inkjet recording apparatus; and an ink cartridge, an inkjet recording apparatus, and an inkjet recording method using the inkjet ink.

The present invention also relates to an image forming method using the inkjet recording method. Specifically, the present invention relates to an image forming method including a pretreatment step of applying a pretreatment liquid to a recording medium, and an ink jetting step of jetting an inkjet ink so as to form an image onto the recording medium coated with the pretreatment liquid. An image formed record obtained by the image forming method has excellent image quality, particularly, excellent image density and color saturation, and less feathering and white spots, and less smear adhesion (also referred to as excellent rubfastness).

BACKGROUND ART

Conventionally, as for inkjet inks, dye inks have been mainly used in view of their high color-developing ability, high reliability, etc.; in recent years, however, attention has also been drawn to pigment inks because the dye inks have disadvantages of poor water resistance and light resistance. In the pigment inks, a polymer compound is used so as to stably disperse a pigment in water or to fix a pigment on a recording medium after the pigment ink is placed on the recording medium (hereinafter, also referred to as attached on a recording medium).

On the other hand, in the inkjet recording apparatus, in order to attain high quality image and high speed printing, the diameters of nozzles serving as an ink jetting unit tend to be reduced. However, a pigment ink containing a polymer compound tends to form aggregation of solid contents due to water evaporation, and when the pigment ink is used in an inkjet recording apparatus equipped with a nozzle having a reduced diameter, ejection stability is hard to be secured. Thus, an attempt is made to improve ejection stability of the pigment ink containing a polymer compound.

Patent Literature 1 discloses an ink of which viscosity is not allowed to increase more than ten-fold when the ink is twice as concentrated. By the use of such ink, the ejection stability is excellent, when an image is recorded on an inkjet paper, a pigment aggregates so as to suppress ink spreading and thus it is possible to prevent occurrence of white spots. However, specific examples of the ink of which viscosity is not allowed to increase more than ten-fold when the ink is twice as concentrated, disclosed in Patent Literature 1 are only inks having a low pigment concentration and a low viscosity. It is difficult to form high-quality images on plain paper using these inks. Moreover, a method for suppressing thickening of the ink having a high pigment concentration upon water evaporation is not disclosed at all.

Patent Literature 2 discloses an ink wherein the rate of increase in viscosity (mPa·s/%) caused by water evaporation of an ink is 5.0 or less when the amount of water evaporation is 30% by mass or less with respect to the total mass of the ink, and the rate of increase in viscosity attains a point (a value) of greater than 50 when the amount of water evaporation is between 30% by mass and 45% by mass. The ink of Patent Literature 2 rapidly thickens upon attaching onto plain paper and drying, thereby exhibiting high printing quality even at high speed printing. However, when the ink dries in a nozzle of a recording apparatus, ejection stability becomes poor.

Patent Literature 3 discloses an ink using a water dispersion of colorant-containing water-insoluble vinyl polymer particles. By the use of the ink, a hydrophobic functional group which inhibits penetration into the inside of paper is included in vinyl polymer particles, so that the vinyl polymer particles easily remain on a paper surface, thereby obtaining high printing density. However, the water-insoluble vinyl polymer particles used in this ink have high aggregation property, causing a problem in ejection stability.

As described above, it has been considered that it is necessary to use an ink of which viscosity rapidly increases due to water evaporation, in order to form a high grade image by printing at high speed on plain paper. However, it is difficult for such ink to secure reliability and handleability, as things stand.

Moreover, a conventional inkjet recording method has a problem that image defects as typified by feathering may be easily caused depending on the combination of an ink and a recording medium, largely decreasing image quality. In order to solve the problem, a method of combining an inkjet ink and a treatment liquid containing fine particles is proposed.

Patent Literature 4 discloses a liquid composition which is applied with an aqueous ink to a recording medium and contains fine particles in a dispersion state, wherein the surfaces of the particles are charged with a polarity opposite to that of the aqueous ink. However, this method is unable to achieve a sufficient effect on the suppression of feathering. Moreover, in these proposals of using the liquid composition containing fine particles, another problem occurs in terms of fixing ability of the recording liquid. Specifically, the liquid composition and the aqueous ink are attached to the recording medium and then a vehicle permeates the recording medium, thereby accumulating a mixture of the fine particles with the colorant on a surface of the recording medium. The thus formed accumulation is mechanically vulnerable, and may be easily removed by rubbing by hand and the like. Therefore, ink smears a user's hand and backface of overlapped ink records, resulting in failure of poor rubfastness.

Patent Literature 5 discloses an inkjet recording method in which a first liquid containing polymer fine particles and an ink composition are attached onto a recording medium, in order to solve the problem of rubfastness. According to the method, as a colorant itself does not have a function for improving rubfastness, a large amount of polymer particles is necessary to obtain a sufficient rubfastness. However, the addition of a large amount of polymer particles may cause side effects, such as decrease in ejection stability and storage stability, viscosity increase or the like. Thus, problems have not been solved yet.

CITATION LIST

Patent Literature

PTL 1: Japanese Patent Application Laid-Open (JP-A) No. 2002-337449
PTL 2: JP-A No. 2006-16412
PTL 3: JP-A No. 2005-36203
PTL 4: JP-A No. 2001-199151
PTL 5: International publication No. WO 2000/006390

BRIEF SUMMARY OF THE INVENTION

The present invention is made to solve the above-mentioned conventional problems, and achieves the following object. An object of the present invention is to provide an inkjet ink which is excellent in image quality and high-speed printing on plain paper, in storage stability and in ejection stability and gives less load on a maintenance device for an inkjet recording apparatus; an ink cartridge, a recording apparatus, and a recording method using the inkjet ink.

Another object of the present invention is to provide an image forming method of forming an image on a recording medium using the pretreatment liquid and the inkjet ink, in which the image has excellent image quality, particularly, excellent image density and color saturation, and less feathering and white spots, and less smear adhesion in an image portion.

The inventors of the present invention have been diligently studied to attain the object, and found that the above-described problems can be solved by the use of an inkjet ink having a certain density under a certain condition, thereby completing the present invention.

<1> An inkjet ink including a water dispersion of pigment-containing water-insoluble vinyl polymer particles; a water-soluble organic solvent; and water, wherein an ink residue from the inkjet ink has a viscosity of 3,000 mPa·s or less, the ink residue is obtained by leaving the inkjet ink to stand at a temperature of 25° C. and a humidity of 15% until substantially no mass change occurs, and wherein the inkjet ink, pH of which is adjusted to 7 with an acid has a viscosity of 500 mPa·s or more.

<2> The inkjet ink according to <1>, wherein the water-insoluble vinyl polymer is obtained by polymerizing a monomer mixture containing:

(A) a monomer expressed by General Formula (1),

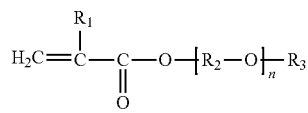

General Formula (1)

where $R_1$ represents a hydrogen atom or a methyl group; $R_2$ represents an alkylene group having 2 to 8 carbon atoms or an alkylene group having 2 to 4 carbon atoms in which a hydrogen atom is substituted with a phenyl group; n represents an integer of 2 to 30; and $R_3$ represents a straight-chain or branched chain alkyl group having 2 to 30 carbon atoms;

(B) a monomer containing salt-forming group; and (C) a hydrophobic monomer.

<3> The inkjet ink according to <2>, wherein (C) the hydrophobic monomer contains at least one selected from the group consisting of:

(C-1) a monomer expressed by General Formula (2),

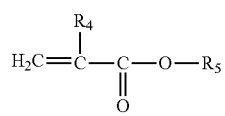

General Formula (2)

where $R_4$ represents a hydrogen atom or a methyl group; and $R_5$ represents an alkyl group having 1 to 22 carbon atoms, an aryl, alkylaryl or arylalkyl group having 6 to 22 carbon atoms or a cyclic hydrocarbon group having 3 to 22 carbon atoms;

(C-2) a monomer expressed by General Formula (3),

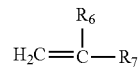

General Formula (3)

where $R_6$ represents a hydrogen atom or a methyl group; and $R_7$ represents a substituted or unsubstituted phenyl, biphenyl or naphthalene group; and (C-3) a macromer.

<4> The inkjet ink according to any one of <1> to <3>, wherein the inkjet ink contains at least one polyhydric alcohol having an equilibrium water content of 30% by mass or more at a temperature of 23° C. and a humidity of 80% as the water-soluble organic solvent.

<5> The inkjet ink according to <4>, wherein the polyhydric alcohol is selected from the group consisting of glycerin and 1,3-butanediol.

<6> The inkjet ink according to any one of <1> to <5>, wherein the inkjet ink contains one of a polyol compound having 8 to 11 carbon atoms and a glycol ether compound having 8 to 11 carbon atoms as a penetrating agent.

<7> The inkjet recording ink according to <6>, wherein the polyol compound having 8 to 11 carbon atoms contains one of 2-ethyl-1,3-hexanediol, and 2,2,4-trimethyl-1,3-pentanediol.

<8> The inkjet ink according to any one of <1> to <7>, wherein the inkjet ink has a viscosity at 25° C. of 5 mPa·s to 20 mPa·s, a static surface tension of 35 mN/m or less, and a pH of 8.5 or more.

<9> The inkjet ink according to any one of <1> to <8>, wherein an average particle diameter of the pH adjusted ink is five times or greater than an average particle diameter of the ink, pH of which is not adjusted.

<10> An inkjet recording method containing applying a stimulus to the inkjet ink according to any one of <1> to <9> so as to jet the inkjet ink, thereby forming an image onto a recording medium.

<11> An image forming method containing applying a pretreatment liquid to a recording medium, and applying a stimulus to the inkjet ink according to any one of <1> to <9> so as to jet the inkjet ink, thereby forming an image onto the recording medium coated with the pretreatment liquid, wherein the pretreatment liquid contains: at least one selected from the group consisting of a cationic organic compound, a water-soluble organic acid and a water-soluble metal salt compound; a water-soluble organic solvent; and water.

<12> The image forming method according to <11>, wherein the pretreatment liquid is applied to the recording medium so that a coated amount is 0.1 g/m² to 10 g/m² on a dry basis.

<13> The image forming method according to any one of <11> to <12>, wherein the pretreatment liquid contains at least one of a fluorine surfactant and a silicone surfactant.

<14> An ink cartridge including the inkjet ink according to any one of <1> to <9> in a container.

<15> An inkjet recording apparatus containing an ink jetting unit configured to apply a stimulus to the inkjet ink according to any one of <1> to <9> so as to jet the inkjet ink, thereby forming an image onto a recording medium.

The present invention is made to solve the above-mentioned conventional problems, and achieve the above-mentioned object, and to provide an inkjet ink which is excellent in image quality and high-speed printing on plain paper, in storage stability and in ejection stability and gives less load on a maintenance device for an inkjet recording apparatus; and an ink cartridge, a recording apparatus, and a recording method, using the ink.

DESCRIPTION OF EMBODIMENTS

Figure 1:
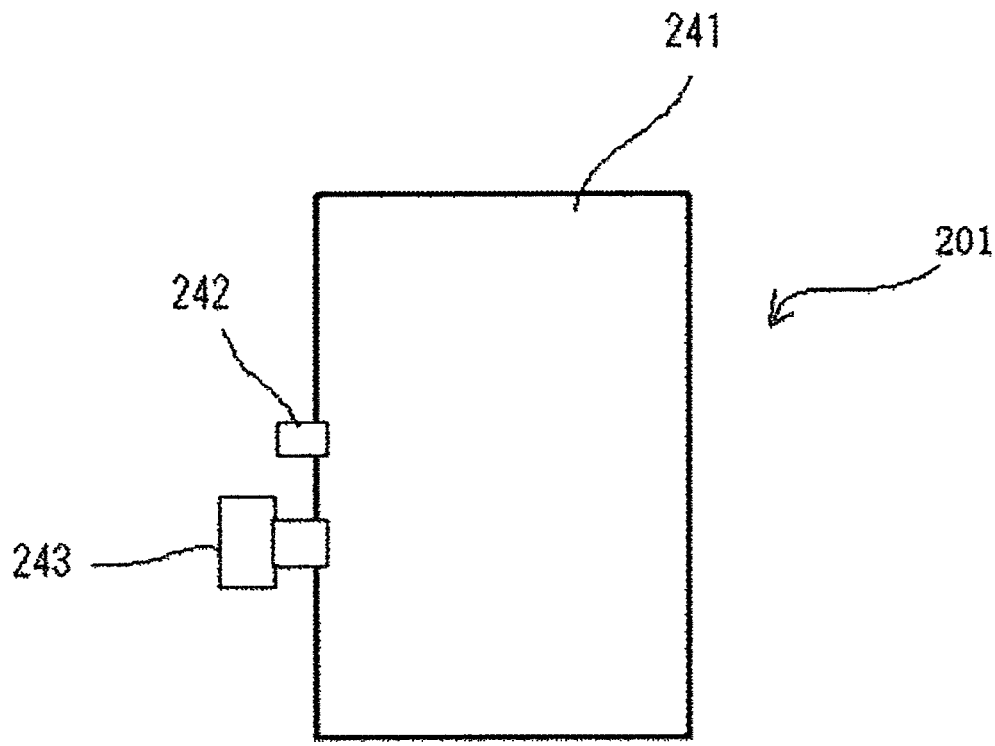
FIG. 1 is a schematic view showing an example of an ink cartridge of the present invention.

Hereinafter, a preferred embodiment of the present invention will be explained.
(Inkjet Ink)

The inkjet ink of the present invention contains a water dispersion of pigment-containing water-insoluble vinyl polymer particles, a water-soluble organic solvent and water, and further contains other components as necessary.

An ink residue from the inkjet ink of the present invention has a viscosity of 3,000 mPa·s or less, the ink residue is obtained by leaving the inkjet ink to stand at a temperature of 25° C. and a humidity of 15% until substantially no mass change occurs, and the inkjet ink, the pH of which is adjusted to 7 with an acid has a viscosity of 500 mPa·s or more.

According to the inkjet ink of the present invention, the viscosity of the ink residue obtained by leaving the inkjet ink to stand at a temperature of 25° C. and a humidity of 15% until substantially no mass change occurs is adjusted to 3,000 mPa·s or less, so that the rise of the viscosity of the ink in a nozzle in an inkjet recording apparatus can be suppressed, thereby securing ejection stability. Moreover, when the ink adheres in a maintenance device for the inkjet recording apparatus, and water in the ink evaporates, thereby achieving a moisture equilibrium state, a waste ink does not fix therein, and long-term reliability is secured. Next, the pH of the ink is adjusted to 7 with an acid, a pigment forms aggregation, and the viscosity of the ink at 25° C. becomes 500 mPa·s or more. Thus, when the ink attaches onto plain paper, the pH of the ink becomes 7 or less due to cation existing on a surface of the plain paper, and the ink rapidly aggregates and thickens. Thus, the pigment absorption into the paper is inhibited, and high quality image can be formed on plain paper at high speed. Such viscosity property of the ink is attained by selecting a water dispersion of pigment-containing water-insoluble vinyl polymer particles, a water-soluble organic solvent and water, as an ink component, and appropriately combining thereof.

<Pigment>

A pigment contained in the inkjet ink of the present invention is not particularly limited and may be suitably selected in accordance with the intended use. Examples of the pigment include inorganic pigments and organic pigments for black or color. These may be used alone or in combination.

—Inorganic Pigment—

Examples of inorganic pigments include titanium oxide, iron oxide, calcium carbonate, barium sulfate, aluminum hydroxide, barium yellow, cadmium red and chrome yellow and also include carbon blacks produced by known methods such as contact method, furnace method and thermal method.

—Organic Pigment—

Examples of organic pigments include azo pigments (such as azo lakes, insoluble azo pigments, condensed azo pigments and chelate azo pigments), polycyclic pigments (such as phthalocyanine pigments, perylene pigments, perinone pigments, anthraquinone pigments, quinacridone pigments, dioxazine pigments, indigo pigments, thioindigo pigments, isoindolinone pigments and quinophthalone pigments), dye chelates (such as basic dye chelates and acid dye chelates), nitro pigments, nitroso pigments and aniline black. Of these pigments, particular preference is given to those which have great affinity with water.

Of the above-mentioned pigments, specific examples of pigments for black that are preferably used include carbon blacks (C. I. Pigment Black 7) such as furnace black, lamp black, acetylene black and channel black; metals such as copper, iron (C. I. Pigment Black 11) and titanium oxide; and organic pigments such as aniline black (C. I. Pigment Black 1).

Specific examples of pigments for color include C. I. Pigment Yellow 1, 3, 12, 13, 14, 17, 24, 34, 35, 37, 42 (yellow iron oxide), 53, 55, 74, 81, 83, 95, 97, 98, 100, 101, 104, 408, 109, 110, 117, 120, 128, 138, 150, 151, 153 and 183; C. I. Pigment Orange 5, 13, 16, 17, 36, 43 and 51; C. I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (colcothar), 104, 105, 106, 108 (cadmium red), 112, 114, 122 (quinacridone magenta), 123, 146, 149, 166, 168, 170, 172, 177, 178, 179, 185, 190, 193, 209 and 219; C. I. Pigment Violet 1 (rhodamine lake), 3, 5:1, 16, 19, 23 and 38; C. I. Pigment Blue 1, 2, 15, 15:1, 15:2, 15:3 (phthalocyanine blue), 16, 17:1, 56, 60 and 63; and C. I. Pigment Green 1, 4, 7, 8, 10, 17, 18 and 36.

The amount of the pigment in the inkjet ink is preferably 2% by mass to 15% by mass, more preferably 3% by mass to 10% by mass, and particularly preferably 5% by mass to 8% by mass. When the amount is less than 2% by mass, the color-developing ability of the ink and image density may be decreased. When the amount is more than 15% by mass, the ink thickens, causing poor ejection stability, and it is not economically preferable.

In the inkjet ink of the present embodiment, the above-described pigment is used as a colorant in terms of water resistance, however, a dye may be contained within a range of the amount which does not degrade the weather resistance, for the purpose of adjustment of color tone.

<Water-Insoluble Vinyl Polymer>

The water-insoluble vinyl polymer contained in the inkjet ink of the present invention is not particularly limited as long as the polymer has a vinyl group and does not dissolve in water, and may be suitably selected in accordance with the intended use. The water-insoluble vinyl polymer may also be obtained by polymerizing a monomer mixture containing (A) a monomer expressed by General Formula (1) (also referred to as Monomer A), (B) a monomer containing salt-forming group (also referred to as Monomer B), and (C) a hydrophobic monomer (also referred to as Monomer C). These monomers may be formed into a component by mixing a certain amount of each monomer, as necessary, or monomers other than Monomers A, B and C may be added within a range of the amount enough to solve the problems of the present invention.

—Monomer A—

Monomer A is a monomer expressed by General Formula (1):

General Formula (1)

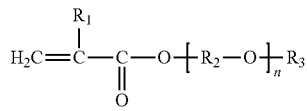

In General Formula (1), $R_1$ represents a hydrogen atom or a methyl group from the viewpoint of polymerization ability. $R_2$ represents an alkylene group having 2 to 8 carbon atoms or an alkylene group having 2 to 4 carbon atoms in which a hydrogen atom is substituted with a phenyl group. Of these, the alkylene group having 2 to 4 carbon atoms is more preferably an ethylene, propylene or butylene group having 2 to 4 carbon atoms. "n" represents an average number of repeating unit of —$R_2$—O— in Monomer A and is preferably 2 to 30, more preferably 2 to 25 even more preferably 2 to 15, and particularly preferably 2 to 10, from the viewpoint of printing density and storage stability. The number "n" of $R_2$ may be the same or different. When they are different from each other, they may be in a form of either block addition or random addition. $R_3$ is preferably a straight-chain or branched chain alkyl group having 2 to 30 carbon atoms, it is preferably an alkyl group having 2 to 22 carbon atoms, more preferably an alkyl group having 8 to 18 carbon atoms, and even more preferably an octyl group, 2-ethylhexyl group, decyl group, dodecyl (lauryl) group, tetradodecyl (myristyl) group, hexadecyl (cetyl) group or octadecyl (stearyl) group, from the viewpoint of high printing density and suitable storage stability.

Monomer A is not particularly limited as long as it is as described above. Examples of Monomer A include an octoxypolyethylene glycol mono(meth)acrylate, octoxypoly(ethylene glycol-propylene glycol)mono(meth)acrylate, octoxypoly(ethylene glycol-butylene glycol)mono(meth)acrylate, lauroxypolyethylene glycol(meth)acrylate, lauroxypoly(ethylene glycol-propylene glycol)mono(meth)acrylate, stearoxypolyethylene glycol mono(meth)acrylate and stearoxypoly(ethylene glyco-propylene glycol)mono(meth)acrylate. These may be used alone or in a mixture of two or more.

A method for producing Monomer A is not particularly limited and may be suitably selected in accordance with the intended use. Monomer A may be obtained by polymerizing the terminal (—OH) of an aliphatic alcohol with an alkylene oxide and by etherifying the polymerized terminal group (—OH). Specific examples of commercially available Monomer (A) include Light Acrylate EA-C manufactured by Kyoeisha Chemical Co., Ltd. and 50POEP-800B, PLE200 and PSE-400 manufactured by Nippon Oil & Fats Co., Ltd.

The amount of Monomer A in the above-mentioned monomer mixture used to polymerize the water-insoluble vinyl polymer is 3% by mass to 25% by mass, and preferably 5% by mass to 20% by mass, from the viewpoint of printing density and ink viscosity.

There is an advantage that, by the use of Monomer A as a monomer constituting the water-insoluble vinyl polymer, an aqueous ink having a high printing density, and excellent storage stability can be obtained. This is probably because an alkyl group which is a terminal group in Monomer A tends to remain on a paper surface. As a result, the aqueous ink can obtain excellent dispersion stability.

Moreover, as Monomer A exhibits high compatibility to a specific water-soluble organic solvent, polymer particles can obtain dispersion stability in the ink residue which reaches moisture equilibrium due to water evaporation, when a specific water-soluble organic solvent is contained in the ink.

—Monomer B—

Monomer B is not particularly limited as long as it has a substituent group which forms salt in neutralization reaction (salt-forming group), and may be suitably selected in accordance with the intended use. Monomer B is preferably an anionic monomer having an anion forming group. The anion forming group is preferable in that it forms anion in water, causing electrostatic repulsion to give dispersion stability to a polymer dispersion, and that when an ink attaches onto a recording medium, electrostatic repulsion force is lost due to pH change, thereby accelerating pigment fixation. Examples of the anionic monomer include one or more types selected from unsaturated carboxylic acid monomers, unsaturated sulfonic acid monomers and unsaturated phosphoric acid monomers. These anionic monomers may be used alone or in a mixture of two or more.

—Unsaturated Carboxylic Acid Monomer—

An unsaturated carboxylic acid monomer is not particularly limited as long as it has a carboxylic group and an unsaturated bond, and may be suitably selected in accordance with the intended use. Examples thereof include an acrylic acid, methacrylic acid, crotonic acid, itaconic acid, maleic acid, fumaric acid, citraconic acid and 2-methacryloyloxymethylsuccinic acid. These may be used alone or in a mixture of two or more.

—Unsaturated Sulfonic Acid Monomer—

An unsaturated sulfonic acid monomer is not particularly limited as long as it has a sulfonic group and an unsaturated bond, and may be suitably selected in accordance with the intended use. Examples of the unsaturated sulfonic acid monomer include styrenesulfonic acid, 2-acrylamido-2-methylpropanesulfonic acid, 3-sulfopropyl(metWacrylate and bis-(3-sulfopropyl)-itaconate. These may be used alone or in a mixture of two or more.

—Unsaturated Phosphoric Acid Monomer—

An unsaturated phosphoric acid monomer is not particularly limited as long as it has a phosphoric group and an unsaturated bond, and may be suitably selected in accordance with the intended use. Examples of the unsaturated phosphoric acid monomer include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate. These may be used alone or in a mixture of two or more.

Of these anionic monomers, unsaturated carboxylic acid monomers are preferable, and acrylic acids and methacrylic acids are more preferable, from the viewpoint of printing density and storage stability.

The amount of Monomer B in the above-mentioned monomer mixture, which is used to polymerize the water-insoluble vinyl polymer, is 3% by mass to 25% by mass, preferably 5% by mass to 20% by mass, and even more preferably 12% by mass to 14% by mass, from the viewpoint of printing density and storage stability. When the amount of Monomer B is less than 3% by mass, it becomes difficult to dissolve in a basic substance and to be coated on a pigment. When the amount of Monomer B is more than 25% by mass, the basic substance added in the ink may dissolve the resin coated on the pigment.

—Monomer C—

Monomer C is not particularly limited as long as it is a hydrophobic monomer capable of giving water resistance to a record on which recording is performed using an inkjet ink, and may be suitably selected in accordance with the intended use. Monomer C is preferably at least one selected from the group consisting of (C-1) a monomer expressed by General Formula (2) (also referred to as Monomer C-1), (C-2) a monomer expressed by General Formula (3) (also referred to as Monomer C-2), and (C-3) a macromer (also referred to as Macromer C-3):

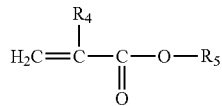

General Formula (2)

In General Formula (2), $R_4$ represents a hydrogen atom or a methyl group; and $R_5$ represents an alkyl group having 1 to 22 carbon atoms, an aryl, alkylaryl or arylalkyl group having 6 to 22 carbon atoms or a cyclic hydrocarbon group having 3 to 22 carbon atoms; and

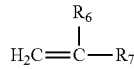

General Formula (3)

In General Formula (3), $R_6$ represents a hydrogen atom or a methyl group; and $R_7$ represents a substituted or unsubstituted phenyl, biphenyl or naphthalene group.

—Monomer C-1—

Of Monomers C-1, as Monomer C-1 having an alkyl group, a monomer with $R_4$ being a methyl group is preferable. Examples of Monomer C-1 having an alkyl group include (meth)acrylates, in which the ester part is an alkyl group having 1 to 22 carbon atoms, such as methyl(meth)acrylate, ethyl(meth)acrylate, (iso)propyl(meth)acrylate, (iso or tertiary)butyl(meth)acrylate, (iso)amyl(meth)acrylate, 2-ethylhexyl(meth)acrylate, (iso)octyl(meth)acrylate, (iso)decyl(meth)acrylate (iso)dodecyl(meth)acrylate, (iso)stearyl(meth)acrylate and behenyl(meth)acrylate. These may be used in a mixture of two or more. It is to be noted that the above-mentioned (iso or tertiary) and (iso) means both the case where these groups are present and the case where these groups are not present. The case where these groups are not present means normal. Moreover, the (meth)acrylate means both a methacrylate and an acrylate. This is the same as follows.

Examples of Monomer C-1 having an aryl group include benzyl(meth)acrylate and phenoxyethyl(meth)acrylate. These may be used alone or in a mixture of two or more.

Examples of Monomers C-1 having a cyclic hydrocarbon group include monocyclic(meth)acrylates, dicyclic acrylates and tri- or more polycyclic(meth)acrylates having 3 or more carbon atoms. Specific examples of the monocyclic(meth)acrylates having 3 or more carbon atoms include cyclopropyl (meth)acrylate, cyclobutyl(meth)acrylate, cyclopentyl(meth) acrylate, cyclohexyl(meth)acrylate, cycloheptyl(meth) acrylate, cyclooctyl(meth)acrylate, cyclononyl(meth) acrylate and cyclodecyl(meth)acrylate. Examples of the dicyclic(meth)acrylates include isobornyl(meth)acrylate and norbornyl(meth)acrylate. Examples of the tricyclic(meth) acrylates include adamantyl(meth)acrylate. Of these, cyclohexyl(meth)acrylate, isobornyl(methacrylate and adamantyl (meth)acrylate are preferable, from the viewpoint of storage stability. These may be used in a mixture of two or more.

—Monomer C-2—

As Monomer C-2 having an aromatic ring, a monomer with $R_6$ being hydrogen or a methyl group is preferable. Monomer C-2 is preferably at least one monomer selected from the group consisting of styrene, vinylnaphthalene, α-methylstyrene, vinyltoluene, ethylvinylbenzene, and 4-vinylbiphenyl from the viewpoint of water resistance. Of these, at least one monomer selected from the group consisting of styrene, α-methylstyrene, vinyltoluene and vinylnaphthalene is more preferable from the viewpoint of printing density and abrasion resistance.

—Monomer C-3—

Examples of Macromer C-3 include macromers having a polymerizable functional group at one terminal and a number average molecular mass of preferably 400 to 500,000 and more preferably 600 to 12,000. Specific examples of the macromers include styrene macromers having a polymerizable functional group at one terminal, silicone macromers having a polymerizable functional group at one terminal, methylmethacrylate macromers having a polymerizable functional group at one terminal, styrene/acrylonitrile macromers having a polymerizable functional group at one terminal, butylacrylate macromers having a polymerizable functional group at one terminal and isobutylmethacrylate macromers having a polymerizable functional group at one terminal. Of these, the styrene macromers having a polymerizable functional group at one terminal is preferable because the pigment-containing water-insoluble vinyl polymer particles are easily formed. Examples of the styrene macromers having a polymerizable functional group at one terminal include styrene homopolymers having a polymerizable functional group at one terminal and copolymers of styrene having a polymerizable functional group at one terminal and other monomers. Of these styrene macromers having a polymerizable functional group at one terminal, styrene macromers having an acryloyloxy group or a methacryloyloxy group as the polymerizable functional group at one terminal are preferable from the viewpoint of dispersibility.

Examples of commercially available styrene macromers include AS-6(S), AN-6(S) and HS-6(S) manufactured by Toagosei Co., Ltd. The number average molecular mass of the macromer is measured by gel chromatography using 1 mmol/L of dodecyldimethylamine-containing chloroform as a solvent and polystyrene as a standard material.

Monomers C-1 and C-2, and Macromer C-3 are used alone or in a mixture of two or more. Of these, Monomer C preferably contains at least one selected from the group consisting of Monomer C-2 having an aromatic ring, and Macromer C-3, from the viewpoint of printing density and abrasion resistance.

The amount of Monomer C in the above-mentioned monomer mixture used to polymerize the water-insoluble vinyl polymer is 50% by mass to 95% by mass, and preferably 60% by mass to 85% by mass, from the viewpoint of storage stability and water resistance.

When Monomer C contains Monomer C-2 having an aromatic ring, the amount of Monomer C-2 having an aromatic ring in the above-mentioned monomer mixture used to polymerize the water-insoluble vinyl polymer is preferably 30% by mass to 80% by mass, and more preferably 35% by mass to 75% by mass, from the viewpoint of abrasion resistance and ink viscosity.

When Monomer C contains Macromer C-3, the amount of Macromer C-3 in Monomer C is preferably 3% by mass to 40% by mass, and more preferably 5% by mass to 25% by mass, from the viewpoint of water resistance and abrasion resistance.

—Weight Average Molecular Weight of Water-Insoluble Vinyl Polymer—

The water-insoluble vinyl polymer has a weight average molecular weight of preferably 3,000 to 300,000, and more preferably 5,000 to 200,000, from the viewpoint of printing density and ejection stability. The weight average molecular weight is measured by a method which will be explained in Production Example below.

—Method for Producing Water-Insoluble Vinyl Polymer—

A method for producing the water-insoluble vinyl polymer is not particularly limited as long as the above-described water-insoluble vinyl polymer is produced by polymerizing Monomers A, B and C, and may be suitably selected in accordance with the intended use. Examples of the method include a block polymerization method, a solution polymerization method, a suspension polymerization method and an emulsion polymerization method. Of these, the solution polymerization method is preferable from the viewpoint of control reaction and heat of reaction. The solvent used in the solution polymerization method is preferably a polar organic solvent from the viewpoint of adjustment of polymerization degree. In the case where the polar organic solvent is miscible with water, it may be mixed with water for use. Examples of the polar organic solvent include aliphatic alcohols having 1 to 3 carbon atoms such as methanol, ethanol and propanol; ketones such as acetone and methyl ethyl ketone; and esters such as ethyl acetate. Of these, methanol, ethanol, acetone, methyl ethyl ketone, methyl isobutyl ketone or mixed solutions of these solvents and water are preferable. Toluene may be used as necessary.

For polymerization of the water-insoluble vinyl polymer, a radical polymerization initiator may be used. As the radical polymerization initiator, azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile), 1,1'-azobis(1-cyclohexanecarbonitrile) and the like are preferable. Also, organic peroxides such as t-butyl peroxyoctoate, di-t-butyl peroxide and dibenzoyl oxide may also be used. The amount of the polymerization initiator is preferably 0.001 mol to 5 mol and more preferably 0.01 mol to 2 mol, per 1 mol of the monomer mixture.

Upon polymerization of the water-insoluble vinyl polymer, a polymerization chain transfer agent may be further added. Examples of the polymerization chain transfer agent include mercaptans such as octylmercaptan, n-dodecylmercaptan, t-dodecylmercaptan, n-tetradecylmercaptan and 2-mercaptoethanol; xanthogen disulfides such as dimethylxanthogen disulfide and diisopropylxanthogen disulfide; thiuram disulfides such as tetramethylthiuram disulfide and tetrabutylthiuram disulfide; hydrocarbon halides such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, turbinolene, α-terpinene, γ-terpinene, dipentene, α-methylstyrene dimer, 9,10-dihydroanthracene, 1,4-dihydronaphthalene, indene and 1,4-cyclohexadiene; and unsaturated heterocyclic compounds such as 2,5-dihydrofuran. These may be used alone or in a mixture of two or more.

The condition of polymerization of the water-insoluble vinyl polymer by the use of Monomers A, B and C may be suitably selected depending on types of a radical polymerization initiator, a monomer and a solvent to be used. Generally, the polymerization temperature is preferably 30° C. to 100° C. and more preferably 50° C. to 85° C., and the polymerization time is preferably 2 hours to 24 hours. The polymerization atmosphere is preferably an inert gas atmosphere such as nitrogen gas.

After the polymerization reaction is finished, the produced water-insoluble vinyl polymer may be isolated from the reaction solution by a known method such as reprecipitation and distillation of a solvent. Moreover, the obtained water-insoluble vinyl polymer may be purified by repeating reprecipitation or by removing unreacted monomers and the like by means of membrane separation, a chromatographic method or an extraction method.

<Water Dispersion of Water-Insoluble Polymer Particles Containing Pigment>

The water dispersion of pigment-containing water-insoluble vinyl polymer particles as the colorant may be produced in such a manner that the water-insoluble vinyl polymer is dissolved in an organic solvent, and then a pigment, water and a neutralizing agent, and if necessary, a surfactant are added and mixed in the solvent, and if necessary, the resulted mixture is diluted with water, and then the organic solvent is distilled away to make the mixture aqueous, thereby obtaining the water dispersion.

The amount of the pigment used to obtain the water dispersion of pigment-containing water-insoluble vinyl polymer particles is preferably 20 parts by mass to 1,200 parts by mass, more preferably 50 parts by mass to 900 parts by mass, and even more preferably 65 parts by mass to 600 parts by mass, based on 100 parts by mass of the water-insoluble vinyl polymer, from the viewpoint of printing density and of easiness of compounding the pigment in the polymer particles.

As the organic solvent used to obtain the water dispersion of pigment-containing water-insoluble vinyl polymer particles, alcohol solvents, ketone solvents and ether solvents are preferable. Of these, the organic solvents having hydrophilicity are more preferable. When the pigment is coated with the resin, the basic substance is used to dissolve a monomer, and the organic solvent having hydrophilicity is used together, so that the basic substance can be dissolved in the organic solvent to a certain degree. On the other hand, an organic solvent without having hydrophilicity may cause trouble when the resin coated pigment dispersion is dispersed in water. Examples of the alcohol solvent include isopropanol, n-butanol, tertiary butanol, isobutanol and diacetone alcohol. Examples of the ketone solvent include acetone, methyl ethyl ketone, diethyl ketone and methyl isobutyl ketone. Examples of the ether solvent include dibutyl ether, tetrahydrofuran and dioxane. Of these, acetone, methyl ethyl ketone and methyl isobutyl ketone are preferable. Toluene may be used in combination as necessary.

The neutralizing agent used to obtain the water dispersion of pigment-containing water-insoluble vinyl polymer particles is not particularly limited as long as it can neutralize the pH of the water dispersion, and may be suitably selected in accordance with the intended use. A base may be preferably used. Examples thereof include tertiary amines such as trimethylamine and triethylamine, ammonia, sodium hydroxide and potassium hydroxide. By the use of the base, a carboxyl group included in the water-insoluble vinyl polymer is formed into a salt with a strong alkali or the like, so as to be solubilized in water, and then with kneading the polymer water solution and the pigment, the organic solvent which dissolves the water-insoluble vinyl polymer is removed, so that the pigment surface is coated with the water-insoluble vinyl polymer particles, thereby obtaining an aqueous pigment dispersion. The neutralization degree is not particularly limited. The pH of the water dispersion prepared by using the neutralizing agent is not particularly limited. Generally, the resulting water dispersion is preferably in a neutral state, for example, in a pH range from 4 to 10.

Depending on the types of the salt-forming group, the salt-forming group is neutralized at 100% with sodium hydroxide or acetic acid. The solubility of the neutralized water-insoluble vinyl polymer in water at 25° C. is preferably 10% by mass or less, more preferably 5% by mass or less and even more preferably 1% by mass or less, from the viewpoint of decreasing the viscosity of the aqueous ink.

In the water dispersion of the present embodiment and the aqueous ink, the average particle diameter of the pigment-containing water-insoluble vinyl polymer particles is preferably 0.01 μm to 0.50 more preferably 0.02 μm to 0.30 μm and even more preferably 0.04 μm to 0.20 μm, from the viewpoint of preventing nozzles from clogging and storage stability.

<Water-Soluble Organic Solvent>

Examples of the water-soluble organic solvent used in the present embodiment include polyhydric alcohols, polyhydric alcohol alkylethers, polyhydric alcohol arylethers, nitrogen-containing heterocyclic compounds, amides, amines, sulfur-containing compounds, propylene carbonate, and ethylene carbonate. The water-soluble organic solvent of the present embodiment is compatible with pigment-containing water-insoluble vinyl polymer particles, so as to prevent the pigment from aggregation, and to provide excellent storage stability to the pigment, even when an ink is stored for a prolonged period and water therein evaporates. Moreover, the water-soluble organic solvent of the present embodiment retains the large amount of water enough to provide fluidity to the ink even under the condition that the ink is left in an open state.

In the present embodiment, the ink residue obtained by leaving the ink to stand at a temperature of 25° C. and a humidity of 15% until substantially no mass change occurs has a viscosity of 3,000 mPa·s or less. An example of a method for preparing an ink having such properties using the water-soluble organic solvent will be explained. Firstly, by the use of a water-soluble organic solvent having a high equilibrium water content, even when water in the ink evaporates and reaches moisture equilibrium, the water-soluble organic solvent retains a large amount of water, thereby suppressing outstanding rise in viscosity of the ink.

In the present embodiment, a water-soluble organic solvent is having a high equilibrium water content means a water-soluble organic solvent having a equilibrium water content of 30% by mass or more, and preferably 40% by mass or more, at a temperature of 23° C. and a humidity of 80% (herein after referred to as a water-soluble organic solvent A). By the use of the water-soluble organic solvent A, even when water in the ink evaporates and reaches moisture equilibrium, the water-soluble organic solvent A retains a large amount of water so as to prevent rise in viscosity. Note that the equilibrium water content means a water content when a mixture of a water-soluble organic solvent and water is opened at a constant temperature and humidity in the air, and evaporation of water in a solution and absorption of water from the air into an ink are at equilibrium state. Specifically, a saturated potassium chloride aqueous solution is used, the temperature and humidity in a desiccator are kept at 23° C.±1° C. and 80%±3% respectively, petri dishes each containing 1 g of the water-soluble organic solvent weighed are stored inside this desiccator until no mass change occurs, and a saturated moisture content (%) is calculated by the expression:

The saturated water content(%)=(amount of water absorbed in organic solvent)/(amount of organic solvent+water absorbed in organic solvent)×100.

The water-soluble organic solvent A has a boiling point of preferably 140° C. or more, and more preferably 250° C. or more. The water-soluble organic solvent A having a boiling point of 140° C. or more prevents water content from decrease due to evaporation of the water-soluble organic solvent, because evaporation does not occur in the environment where ink is used in general.

In order to prepare the ink of the present embodiment, which is left to stand at a temperature of 25° C. and a humidity of 15% until substantially no mass change occurs so as to obtain the ink residue having a viscosity of 3,000 mPa·s or less, it is necessary to consider the compatibility between the pigment-containing water-insoluble vinyl polymer particles and the water-soluble organic solvent. Generally, the ink containing a water dispersion of polymer particles loses dispersion stability due to water evaporation, thereby forming aggregation. However, when the water-soluble organic solvent having high compatibility with the water dispersion of pigment-containing water-insoluble vinyl polymer particles is present, the dispersion maintains dispersibility in the solution in which water is evaporated, thereby preventing rapid rise in viscosity. Specifically, when a water-insoluble vinyl polymer containing Monomers A, B and C as polymer particles is used with the polyhydric alcohol as the water-soluble organic solvent, the water-insoluble vinyl polymer particles and the polyhydric alcohol are compatible so that a rise in viscosity of the ink in which water is evaporated can be suppressed.

Thus, as the water-soluble organic solvent A in the present embodiment, a polyhydric alcohol having an equilibrium water content of 30% by mass or more at a temperature of 23° C. and a humidity of 80% is preferably used. Specific examples of the water-soluble organic solvent A include 1,2,3-butanetriol (boiling point: 175° C./33 hPa, 38% by mass), 1,2,4-butanetriol (boiling point: 190° C. to 191° C./24 hPa, 41% by mass), glycerin (boiling point: 290° C., 49% by mass), diglycerin (boiling point: 270° C./20 hPa, 38% by mass), triethylene glycol (boiling point: 285° C., 39% by mass), tetraethylene glycol (boiling point: 324° C. to 330° C., 37% by mass), diethylene glycol (boiling point: 245° C., 43% by mass) and 1,3-butanediol (boiling point: 203° C. to 204° C., 35% by mass). Of these, glycerin and 1,3-butanediol are preferably used, because the viscosity decreases upon containing water and a pigment dispersion is kept stable without forming aggregation. When the amount of the water-soluble organic solvent A is 50% by mass or more of the entire water-soluble organic solvent is used, it is excellent to secure ejection stability, and to prevent a waste ink from adhesion in a maintenance device for an ink ejection device.

The inkjet ink of the present embodiment, other than the water-soluble organic solvent A, if necessary, instead of a part of the water-soluble organic solvent A or in addition to the water-soluble organic solvent A, a water-soluble organic solvent having an equilibrium water content of less than 30% by mass at a temperature of 23° C. and a humidity of 80% (hereinafter, referred to as a water-soluble organic solvent B) may be used. Examples of the water-soluble organic solvent B include polyhydric alcohols, polyhydric alcohol alkyl ethers, polyhydric alcohol aryl ethers, nitrogen-containing heterocyclic compounds, amides, amines, sulfur-containing compounds, propylene carbonate, ethylene carbonate and other wetting agents.

Examples of the polyhydric alcohols of the water-soluble organic solvent B include dipropylene glycol (boiling point: 232° C.), 1,5-pentanediol (boiling point: 242° C.), 3-methyl-1,3-butanediol (boiling point: 203° C.), propylene glycol (boiling point: 187° C.), 2-methyl-2,4-pentanediol (boiling point: 197° C.), ethylene glycol (boiling point: 196° C. to 198° C.), tripropylene glycol (boiling point: 267° C.), hexylene glycol (boiling point: 197° C.), polyethylene glycol (viscous liquid to solid), polypropylene glycol (boiling point: 187° C.), 1,6-hexanediol (boiling point: 253° C. to 260° C.), 1,2,6-hexanetriol (boiling point: 178° C.), trimethylol ethane (solid, melting point: 199° C. to 201° C.) and trimethylol propane (solid, melting point: 61° C.).

Examples of the polyhydric alcohol alkyl ethers include ethylene glycol monoethyl ether (boiling point: 135° C.), ethylene glycol monobutyl ether (boiling point: 171° C.), diethylene glycol monomethyl ether (boiling point: 194° C.), diethylene glycol monoethyl ether (boiling point: 197° C.), diethylene glycol monobutyl ether (boiling point: 231° C.), ethylene glycol mono-2-ethylhexyl ether (boiling point: 229° C.) and propylene glycol monoethyl ether (boiling point: 132° C.). Examples of the polyhydric alcohol aryl ethers include ethylene glycol monophenyl ether (boiling point: 237° C.) and ethylene glycol monobenzyl ether (boiling point: 256° C.).

Examples of the nitrogen-containing heterocyclic compounds include 2-pyrrolidone (boiling point: 250° C., melting point: 25.5° C., 47% by mass to 48% by mass), N-methyl-2-pyrrolidone (boiling point: 202° C.), 1,3-dimethyl-2-imidazolidinone (boiling point: 226° C.), s-caprolactam (boiling point: 270° C.) and γ-butyrolactone (boiling point: 204° C. to 205° C.). Examples of the amides include formamide (boiling point: 210° C.), N-methylformamide (boiling point: 199° C. to 201° C.), N,N-dimethylformamide (boiling point: 153° C.) and N,N-diethylformamide (boiling point: 176° C. to 177° C.). Examples of the amines include monoethanolamine (boiling point: 170° C.), diethanolamine (boiling point: 268° C.), triethanolamine (boiling point: 360° C.), N,N-dimethylmonoethanolamine (boiling point: 139° C.), N-methyldiethanolamine (boiling point: 243° C.), N-methylethanolamine (boiling point: 159° C.), N-phenylethanolamine (boiling point: 282° C. to 287° C.) and 3-aminopropyldiethylamine (boiling point: 169° C.). Examples of the sulfur-containing compounds include dimethyl sulfoxide (boiling point: 139° C.), sulfolane (boiling point: 285° C.) and thiodiglycol (boiling point: 282° C.). The above-mentioned other solid wetting agents are preferably sugars and the like.

Examples of the sugars include monosaccharides, disaccharides, oligosaccharides (including trisaccharides and tetrasaccharides) and polysaccharides. Specific examples thereof include glucose, mannose, fructose, ribose, xylose, arabinose, galactose, maltose, cellobiose, lactose, sucrose, trehalose and maltotriose. Here, the polysaccharides represents sugars in a broad sense, including substances that are widespread in the nature, such as α-cyclodextrin and cellulose. Additionally, examples of derivatives of the sugars include reducing sugars of the sugars, exemplified by sugar alcohols (represented by the general formula $HOCH_2(CHOH)_nCH_2OH$ (where "n" represents an integer of 2 to 5)); oxidation sugars of the sugars, exemplified by aldonic acid and uronic acid; amino acid; and thio acid. Of these, sugar alcohols are preferable, and specific examples thereof include maltitol and sorbitol.

The mass ratio between the pigment-containing water-insoluble vinyl polymer particles and the water-soluble organic solvent A significantly affects the stability in the ink ejection from ink heads; and also affects prevention of waste ink from adhesion in the maintenance device for the ink ejection device. When the solid content of the pigment-containing water-insoluble vinyl polymer particles is high and the amount of the water-soluble organic solvent A is small, water evaporation near the ink meniscus of nozzles may result in ejection failure. The mass ratio between the pigment-containing water-insoluble vinyl polymer particles and the water-soluble organic solvent A is preferably 1:2 to 1:10, and more preferably 1:3 to 1:8. Here, the ratio between the mass of the pigment-containing water-insoluble vinyl polymer particles and the mass of the water contained in the water-soluble organic solvent A at equilibrium (temperature of 25° C. and humidity of 80%) is preferably 1:0.2 to 1:7, and more preferably 1:0.6 to 1:4.

The amount of the water-soluble organic solvent in the inkjet ink is preferably 20% by mass to 50% by mass, and more preferably 25% by mass to 45% by mass. When the amount of the water-soluble organic solvent in the inkjet ink is less than 25% by mass, the ejection stability is decreased and a waste ink may adhere in the maintenance device. When the amount is more than 50% by mass, drying property on paper is decreased, and quality of character on plain paper is decreased.

<Other Components>

Other components in the inkjet ink of the present invention are not particularly limited and may be suitably selected in accordance with the necessity. Examples thereof include a penetrating agent, a surfactant, a pH adjuster, a water dispersible resin, an antiseptic/antifungal agent, a chelating reagent, an antirust agent, an anti-oxidizing agent, a UV absorber, an oxygen absorber and a light stabilizer.

<<Penetrating Agent>>

The inkjet ink of the present invention may contain a penetrating agent in order to enhance the ink penetration into a recording medium such as paper, and to enhance drying property and color-developing ability of the ink. The penetrating agent is not particularly limited, and may be suitably selected in accordance with the intended use. Examples thereof include polyol compounds such as aliphatic diol, and glycol ether compounds. Of these, the penetrating agent is preferably at least one of a polyol compound having 8 to 11 carbon atoms, and a glycol ether compound having 8 to 11 carbon atoms. The penetrating agent is different from the water-soluble organic solvents, and it is not that the penetrating agent has no wetting properties. However, as the penetrating agent has relatively lower wetting properties than that of the water-soluble organic solvents, the penetrating agent can be referred to as a material having nonwetting properties. Here, the term "nonwetting properties" is defined as follows: the penetrating agent preferably has a solubility of 0.2% by mass to 5.0% by mass in water at 25° C. Of theses, 2-ethyl-1,3-hexanediol (solubility: 4.2% at 25° C.) and 2,2,4-trimethyl-1,3-pentanediol (solubility: 2.0% at 25° C.) are particularly preferably used. These penetrating agents are preferable because they are well compatible with the water-insoluble vinyl polymer obtained by polymerization of Monomers A, B and C, and do not cause rise in viscosity of the ink residue in which water is evaporated.

Examples of other polyol compounds as aliphatic diols include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol and 5-hexene-1,2-diol.

These penetrating agents are used alone or in combination. Alternatively, the following other penetrating agents may be used in combination.

Other penetrating agents which can be additionally used are not particularly limited as long as they dissolve in the ink and can be adjusted to have desired properties, and may be suitably selected in accordance with the intended use. Examples thereof include alkyl and allyl ethers of polyhydric alcohols, such as diethylene glycol monophenyl ether, ethylene glycol monoallylether, propylene glycol monobutyl ether and tetraethylene glycol chlorophenyl ether; and lower alcohols such as ethanol.

The amount of the penetrating agent contained in the inkjet ink is preferably 0.1% by mass to 4.0% by mass. When the amount is less than 0.1% by mass, the ink does not have quick-drying properties and thus image bleeding may arise. When it is greater than 4.0% by mass, the dispersion stability of the colorant is impaired, and thus a nozzle becomes easily clogged; also, the ink has more penetrability to a recording medium than necessary, and thus image density may decrease or ink strike-through may arise.

<<Surfactant>>

The inkjet ink of the present invention may include a surfactant in order to enhance color-developing ability of the ink, and to enhance ink penetration into a recording medium. As the surfactant used in the inkjet ink of the present embodiment, preferred are surfactants having a low surface tension and high penetrability and leveling ability and do not impair dispersion stability regardless of the type of the colorant or the combination of the water-soluble organic solvents. Examples of the surfactants include anionic surfactants, cationic surfactants, nonionic surfactants, fluorine surfactants, silicone surfactants and amphoteric surfactants. These surfactants may be used alone or in combination.

—Anionic Surfactant—

The anionic surfactants are not particularly limited as long as they dissociate in water to form an anionic group, and may be suitably selected in accordance with the intended use. Examples of the anionic surfactants include polyoxyethylene alkyl ether acetates, dialkyl sulfosuccinates, dodecylbenzene sulfonates, laurates, salts of polyoxyethylene alkyl ether sulfate, alkylallyl sulfonate, alkylnaphthalene sulfonate, alkyl phosphate, alkyl sulfate, alkyl sulfonate, alkylether sulfate, alkyl sulfosuccinate, alkylester sulfates, alkylbenzene sulfonates, alkyldiphenyl ether disulfonates, alkylaryl ether phosphates, alkylaryl ether sulfates, alkylaryl etherester sulfates, olefin sulfonate, alkane olefin sulfonate, polyoxyethylene alkylether phosphates, polyoxyethylene alkylether sulfates, ether carboxylates, sulfosuccinates, α-sulfo fatty acid esters, fatty acid salts, condensates of fatty acid with amino acid, and naphthenic acid salts. Of these, polyoxyethylene alkyl ether acetates and dialkyl sulfosuccinates are preferable.

—Cationic Surfactant—

The cationic surfactants are not particularly limited as long as they dissociate in water to form a cationic group, and may be suitably selected in accordance with the intended use. Examples of the cationic surfactants include alkyl amine salts, dialkyl amine salts, aliphatic amine salts, benzalkonium salts, quaternary ammonium salts, alkylpyridinium salts, imidazorinium salts, sulfonium salts and phosphonium salts.

—Nonionic Surfactant—

The nonionic surfactants are not particularly limited as long as they do not dissociate in water, and may be suitably selected in accordance with the intended use. Examples of nonionic surfactants include acetylene glycol surfactants, polyoxyethylene alkyl ethers, polyoxypropylene polyoxyethylene alkyl ethers, polyoxyethylene alkyl phenyl ethers, polyoxyethylene alkyl esters, polyoxyethylene sorbitan fatty acid esters, polyoxyethylene alkylamines, and polyoxyethylene alkylamides.

—Amphoteric Surfactants—

The amphoteric surfactants are not particularly limited as long as they dissociate in water to form an anionic group, a cationic group, and both anionic and cationic groups, and may be suitably selected in accordance with the intended use. Examples of the amphoteric surfactants include imidazoline derivatives such as imidazorinium betaine; dimethylalkyl lauryl betaine, alkylglycine and alkyldi(aminoethyl)glycine.

—Fluorine Surfactant—

The fluorine surfactants are not particularly limited as long as they have covalently-bonded fluorine atoms, and may be suitably selected in accordance with the intended use. The fluorine surfactant preferably includes 2 to 16 fluorine-substituted carbon atoms, and more preferably 4 to 16 fluorine-substituted carbon atoms. When the fluorine surfactant includes less than two carbon atoms, effects of the fluorine may not be obtained. When it includes more than 16 carbon atoms, there may be problems with ink storage stability, etc.

Examples of the fluorine surfactants include perfluoroalkyl sulfonic acid compounds, perfluoroalkyl carboxylic acid compounds, perfluoroalkyl phosphoric acid ester compounds, perfluoroalkyl ethylene oxide adducts, and polyoxyalkylene ether polymer compounds having perfluoroalkylether groups in side chains. Of these, polyoxyalkylene ether polymer compounds having perfluoroalkylether groups in side chains are more preferable because they have low foaming properties. The fluorine surfactants expressed by the following Structural Formula (4) are even more preferable.

$$CF_3CF_2(CF_2CF_2)_m\text{—}CH_2CH_2O(CH_2CH_2O)_nH \quad \text{Structural Formula (4)}$$

In Structural Formula (4), "m" represents an integer of 0 to 10, and "n" represents an integer of 1 to 40.

Examples of the perfluoroalkyl sulfonic acid compounds include perfluoroalkyl sulfonic acid and perfluoroalkyl sulfonate. Examples of the perfluoroalkyl carboxylic compounds include perfluoroalkyl carboxylic acid and perfluoroalkyl carboxylate. Examples of the perfluoroalkyl phosphoric acid ester compounds include perfluoroalkyl phosphoric acid ester and salts of perfluoroalkyl phosphoric acid ester. Examples of the polyoxyalkylene ether polymer compounds having perfluoroalkylether groups in side chains include polyoxyalkylene ether polymers having perfluoroalkylether groups in side chains, sulfuric acid ester salts of polyoxyalkylene ether polymers having perfluoroalkylether groups in side chains, and salts of polyoxyalkylene ether polymers having perfluoroalkylether groups in side chains. Examples of counterions for salts in these fluorine surfactants include ions of Li, Na, K, $NH_4$, $NH_3CH_2CH_2OH$, $NH_2(CH_2CH_2OH)_2$ and $NH(CH_2CH_2OH)_3$.

As the fluorine surfactants, suitably synthesized compounds may be used, or commercially available products may be used. Examples of the commercially available products include SURFLON S-111, S-112, S-113, S-121, S-131, S-132, S-141, S-145 and S-386 (all of which are produced by Asahi Glass Co., Ltd.), FLUORAD FC-93, FC-95, FC-98, FC-129, FC-135, FC-170C, FC-430 and FC-431 (all of which are produced by Sumitomo 3M Limited), MEGAFAC F-470, F-1405 and F-474 (all of which are produced by Dainippon Ink And Chemicals, Incorporated), ZONYL TBS, FSP, FSA, FSN-100, FSN, FSO-100, FSO, FS-300 and UR (all of which are produced by DuPont), FT-110, FT-250, FT-251, FT-400S, FT-150 and FT-400SW (all of which are produced by Neos Company Limited), and POLYFOX PF-136A, PF-156A, PF-151N, PF-154, PF-159 (produced by OMNOVA Solutions Inc.). Of these, FS-300 produced by DuPont, FT-110, FT-250, FT-251, FT-400S, FT-150 and FT-400SW produced by Neos Company Limited, and POLYFOX PF-151N produced by OMNOVA Solutions Inc. are particularly preferable in that printing quality, particularly color-developing ability and uniform dying ability to paper, improves remarkably.

As the specific Examples of the fluorine surfactants, those expressed by the following Structural Formulas (5) to (16) are preferably used.

(1) Anionic Fluorine Surfactant

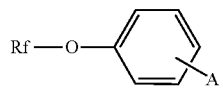
Structural Formula (5)

In Structural Formula (5), Rf represents a mixture of fluorine-containing hydrophobic groups expressed by the following Structural Formulas. "A" represents —$SO_3X$, —COOX or —$PO_3X$ (where X is a counter anion, specifically a hydrogen atom, or an ion of Li, Na, K, $NH_4$, $NH_3CH_2CH_2OH$, $NH_2(CH_2CH_2OH)_2$ or $NH(CH_2CH_2OH)_3$).

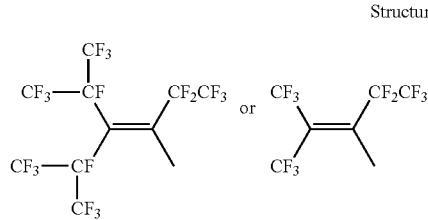
Structural Formula (6)

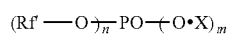
Structural Formula (7)

In Structural Formula (7), Rf represents a fluorine-containing group expressed by the following Structural Formula (8). X represents the same as defined above. "n" represents an integer of 1 or 2, and "m" represents 2-n.

F—$(CF_2CF_2)_n$—$CH_2CH_2$—     Structural Formula (8)

In Structural Formula (8), "n" represents an integer of 3 to 10.

Rf—S—$CH_2CH_2$—COO.X     Structural Formula (9)

In Structural Formula (9), Rf and X respectively represent the same as defined above.

Rf—$SO_3$.X     Structural Formula (10)

In Structural Formula (10), Rf and X respectively represent the same as defined above.

(2) Nonionic Fluorine Surfactant

Rf—O—$(CH_2CH_2O)_n$H     Structural Formula (11)

In Structural Formula (11), Rf represents the same as defined above. "n" represents an integer of 5 to 20.

Rf'—O—$(CH_2CH_2O)_n$H     Structural Formula (12)

In Structural Formula (12), Rf' represents the same as defined above. "n" represents an integer of 1 to 40.

(3) Amphoteric Fluorine Surfactant

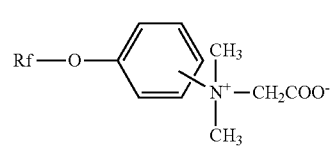
Structural Formula (13)

In Structural Formula (13), Rf represents the same as defined above.

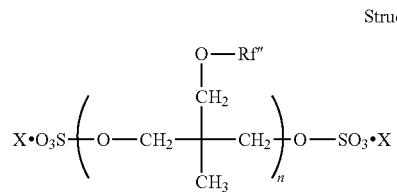
Structural Formula (14)

In Structural Formula (14), Rf represents a fluorine-containing group expressed by the following Structural Formula (15). "n" represents an integer of 0 to 10. X represents the same as defined above.

F—$(CF_2CF_2)_n$$CH_2$—     Structural Formula (15)

In Structural Formula (15), "n" represents an integer of 1 to 4.

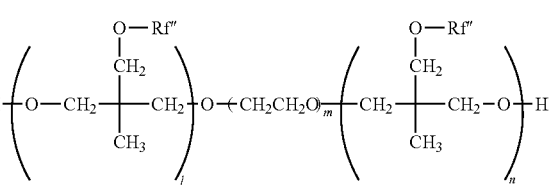
Structural Formula (16)

In Structural Formula (16), Rf represents the same as defined above. "l" represents an integer of 0 to 10, "m" represents an integer of 0 to 10, and "n" represents an integer of 0 to 10.

The silicone surfactants are not particularly limited and may be suitably selected in accordance with the intended use, with preference given to a compound which does not decompose even at high pH values. Examples thereof include side-chain-modified polydimethylsiloxane, both-end-modified polydimethylsiloxane, one-end-modified polydimethylsiloxane and side-chain and both-end-modified polydimethylsiloxane. Of these, polyether-modified silicone-based surfactants having polyoxyethylene groups or polyoxyethylenepolyoxypropylene groups as modifying groups are particularly preferable because they exhibit favorable properties as aqueous surfactants.

The polyether-modified silicone surfactants are not particularly limited and may be suitably selected in accordance with the intended use. Examples thereof include a compound expressed by the following structural formula, which is prepared by introducing polyalkyleneoxide units into side chains of Si portions of a dimethylpolysiloxane.

Structural Formula (17)

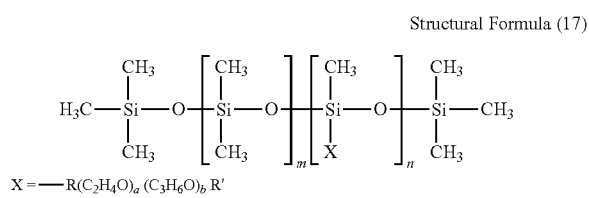

X = —R(C₂H₄O)ₐ(C₃H₆O)ᵦ R'

In Structural Formula (17), "m", "n", "a" and "b" each represents an integer. R and R' each represents an alkyl group or an alkylene group.

As the silicone surfactants, suitably synthesized compounds may be used, or commercially available products may be used. Examples thereof include KF-618, KF-642 and KF-643 (manufactured by Shin-Etsu Chemical Co., Ltd.); EMALEX-SS-5602, SS-1906EX (NIHON EMULSION Co., Ltd.); FZ-2105, FZ-2118, FZ-2154, FZ-2161, FZ-2162, FZ-2163, FZ-2164 (Dow Corning Toray Co., Ltd.); and BYK-33, BYK-387 (BYK Japan KK).

The amount of any of the surfactants contained in the inkjet ink is preferably 0.01% by mass to 3.0% by mass, more preferably 0.5% by mass to 2% by mass. When the amount is less than 0.01% by mass, the addition of the surfactant may be ineffective. When it is greater than 3.0% by mass, the ink has more penetrability to a recording medium than necessary, and thus image density may decrease or ink strike-through may arise.

<<pH Adjuster>>

The pH of the inkjet ink of the present invention may be adjusted by a pH adjuster in order to exhibit inkjet ink property. The pH adjuster is not particularly limited as long as it can adjust the pH to the range of 8 to 11 without having an adverse effect on an inkjet ink to be prepared, and may be suitably selected in accordance with the intended use. Examples thereof include alcohol amines, hydroxides of alkali metals, ammonium hydroxides, phosphonium hydroxides, and carbonates of alkali metals. When the pH is less than 8 or greater than 11, the inkjet head and/or an ink supply unit are/is dissolved by large amounts, and thus troubles such as degradation or leakage of the ink and ejection failure may occur Examples of the alcohol amines include diethanolamine, triethanolamine and 2-amino-2-ethyl-1,3-propanediol. Examples of the hydroxides of alkali metals include lithium hydroxide, sodium hydroxide and potassium hydroxide. Examples of the ammonium hydroxides include ammonium hydroxide, quaternary ammonium hydroxides and quaternary phosphonium hydroxides. Examples of the carbonates of alkali metals include lithium carbonate, sodium carbonate and potassium carbonate.

As the viscosity of the inkjet ink of the present embodiment highly depends on pH, a pH adjuster is added as a pigment aggregation preventing agent so as to prevent pH decrease causing aggregation and thickening of the pigment during storage, thereby obtaining a highly-reliable ink.

<<Water-Dispersible Resin>>

The water-dispersible resin is superior in film-forming property (image-forming property), has high water repellency, high water resistance and high weather resistance and is useful for recording images with high water resistance and high density (high color-developing ability). Examples thereof include condensed synthetic resins, additional synthetic resins and natural polymer compounds. Examples of the condensed synthetic resins include polyester resins, polyurethane resins, polyepoxy resins, polyamide resins, polyether resins, poly(meth)acrylic resins, acrylic-silicone resins and fluorine resins. Examples of the additional synthetic resins include polyolefin resins, polystyrene resins, polyvinyl alcohol resins, polyvinyl ester resins, polyacrylic resins and unsaturated carboxylic resins. Examples of the natural polymer compounds include celluloses, rosins and natural rubbers. Of these, polyurethane resin fine particles, acrylic-silicone resin fine particles and fluorine resin fine particles are particularly preferable from the view point of enhancing ink fixation on a recording medium such as paper, and color-developing ability (image density and color saturation).

Since the water-dispersible resin has its molecular chains broken by dispersion destruction, hydrolysis or the like under strongly alkaline or acidic conditions, the pH thereof is preferably 4 to 12, more preferably 6 to 11 and even more preferably 7 to 9, especially in view of its miscibility with the water dispersion of pigment-containing water-insoluble vinyl polymer particles.

The average particle diameter (D50) of the water-dispersible resin is related to the viscosity of dispersion liquid As to water-dispersible resins having the same composition, the smaller the average particle diameter is, the greater the viscosity is per the same solid content. In order to avoid excessively high ink viscosity when ink has been formed, it is desirable for the average particle diameter (D50) of the water-dispersible resin to be 50 nm or greater. Also, when the water-dispersible resin has a particle diameter that reaches up to several tens of micrometers, particles become larger in size than a nozzle orifice of the inkjet head, and thus the water-dispersible resin cannot be used. When particles which are smaller in size than the nozzle orifice but still large in diameter are present in the ink, the ability of the ink to eject is degraded. Accordingly, in order to prevent the ink ejection ability from being impaired, the average particle diameter (D50) is preferably 200 nm or less, and more preferably 150 nm or less.

The water-dispersible resin serves to fix the water-dispersible colorant onto paper and preferably forms into a coating at normal temperature so as to enhance fixing properties of the coloring material. For that reason, the minimum film-forming temperature (MFT) of the water-dispersible resin is preferably 30° C. or less. Also, when the water-dispersible resin has a glass transition temperature of −40° C. or less, the resin coating becomes highly viscous, and so printed matter becomes tacky; therefore, the water-dispersible resin preferably has a glass transition temperature of −30° C. or more.

The amount of the water-dispersible resin contained in the inkjet ink is preferably 1% by mass to 15% by mass, more preferably 2% by mass to 7% by mass, as a solid content. Here, the amounts of the colorant, pigment in the colorant, and the water-dispersible resin contained in the ink as solid contents can be measured, for example, by separating only the colorant and the water-dispersible resin from the ink. When a pigment is used as the colorant, it is possible to measure the ratio between the colorant and the water-dispersible resin by evaluating the mass decrease rate according to thermogravimetric analysis. Also, when the molecular structure of the colorant is obvious, it is possible in the case of pigment and dye to determine the amount of the colorant as a solid content by means of NMR, and it is possible in the case of inorganic pigment, gold-containing organic pigment and gold-containing dye contained in heavy-metal atoms and molecular structures to determine the amount of the colorant as a solid content by means of fluorescent X-ray analysis. As to the inkjet ink of the present invention, the water content is normally 50% by mass or more, and the total amount of resin and pigment is normally 3% by mass or more. Thus, the evaporation rate of a solvent is normally 50% by mass to 97% by mass.

<<Antiseptic/Antifungal Agent>>

The inkjet ink of the present invention may include an antiseptic/antifungal agent in order to prevent the ink from corrosion and getting moldy. Examples of the antiseptic/antifungal agent include sodium dehydroacetate, sodium sorbate, sodium 2-pyridinethiol-1-oxide, sodium benzoate and sodium pentachlorophenol.

<<Chelating Reagent>>

The inkjet ink of the present invention may include a chelating reagent. The chelating reagent and a free metal ion in the ink forms a complex so as to prevent clogging in a head. Examples of the chelating reagent include sodium ethylenediamine tetraacetate, sodium nitrilotriacetate, sodium hydroxyethylethylenediamine triacetate, sodium diethylenetriamine pentaacetate and sodium uramil diacetate The inkjet ink of the present invention may include an antirust agent in order to prevent metal components used in a tank, flow channel, head, in which the ink flows, from rusting. Examples of the antirust agent include acid sulfites, sodium thiosulfate, ammonium thiodiglycolate, diisopropylammonium nitrate, pentaerythritol tetranitrate and dicyclohexylammonium nitrate.

<<Anti-Oxidizing Agent>>

The inkjet ink of the present invention may include an anti-oxidizing agent in order to prevent an image recorded in a recording medium from discoloring. Examples of the anti-oxidizing agent include phenolic anti-oxidizing agents (including hindered phenol anti-oxidizing agents), amine anti-oxidizing agents, sulfur anti-oxidizing agents and phosphorus anti-oxidizing agents.

The inkjet ink of the present invention includes a UV absorber in order to prevent an image recorded in a recording medium from discoloring. Examples of the UV absorber include benzophenone UV absorbers, benzotriazole UV absorbers, salicylate UV absorbers, cyanoacrylate UV absorbers and nickel complex salt UV absorbers.

—Ink Production Method—

The inkjet ink of the present embodiments is produced by dispersing or dissolving in an aqueous medium a water dispersion of pigment-containing water-insoluble vinyl polymer particles, a water-soluble organic solvent, water and other components as necessary, and further stirring and mixing, as necessary. The dispersion can be performed by a sand mill, a homogenizer, a ball mill, a paint shaker, an ultrasonic dispersing machine, etc., and the stirring and mixing can be carried out, for example, by a typical stirrer using a stirring blade, a magnetic stirrer, a high-speed dispersing machine, or the like —Ink Physical Properties—

The physical properties of the inkjet ink of the present embodiment are not particularly limited and may be suitably selected in accordance with the intended use. For instance, the ink preferably has a viscosity, surface tension, pH and the like in the following range.

The viscosity of the inkjet ink of the present invention at 25° C. is preferably 5 mPa·s to 20 mPa·s. By adjusting the ink viscosity equal to or greater than 5 mPa·s, it is possible to obtain the effects of enhancing printing density and the quality of characters. By adjusting it equal to or less than 20 mPa·s, it is possible to secure ejection stability. In the present invention, the ink viscosity is a viscosity measured by a cone-plate rotational viscometer in accordance with JIS K7117-2. Here, the viscosity can be measured at 25° C., using a viscometer (RE-80L, RE-550L manufactured by Toki Sangyo Co., Ltd.), for instance.

The ink residue, which is obtained by leaving the ink to stand at a temperature of 25° C. and a humidity of 15% until substantially no mass change occurs, preferably has a viscosity of 3,000 mPa·s or less, and more preferably 2,500 mPa·s or less. When the ink residue has a viscosity of more than 3,000 mPa·s, the ink residue in which water has been evaporated may adhere in the maintenance mechanism.

In the present invention, a method of leaving the ink to stand at a temperature of 25° C. and a humidity of 15% until substantially no mass change occurs is as follows: by the use of a commercially available thermo-hygrostat, the volatile component of the ink is volatilized at a temperature of 25° C. and a humidity of 15%, and the ink is left to stand until substantially no mass change occurs while the mass of the ink is measured every one hour. Here, "until substantially no mass change occurs" means that the change of evaporation rate of the volatile component per one hour reaches 1% or less.

The pH adjusted ink, in which pH of the ink is adjusted to 7, preferably has a viscosity at 25° C. of 500 mPa·s or more, more preferably 900 mPa·s or more, and even more preferably 1,000 mPa·s or more. When the viscosity of the pH adjusted ink is less than 500 mPa·s, the pigment is hard to remain on a paper surface, and image density and color saturation may be decreased. The average particle diameter (D50) of the pH adjusted ink is preferably 5 times greater, more preferably 10 times greater, particularly preferably 30 times greater than that of the ink, the pH of which is not adjusted. The average particle diameter (D50) of the pH adjusted ink is less than 5 times greater than that of the ink, the pH of which is not adjusted, the pigment is hard to remain on a paper surface, decreasing effect of improving color-developing ability.

Here, the pH adjustment with an acid is performed in such a manner that 1N hydrochloric acid is dropped in the ink while the pH of the ink is measured by a pH meter. By adjusting the viscosity of the pH adjusted ink to 500 mPa·s or more, the viscosity rapidly increases upon attaching onto a surface of the recording medium having a pH of 7 or less, such as plain paper, so that the pigment can remain on the surface of the recording medium. Here, plain paper differs from a recording medium having an ink receiving layer on a base material, such as inkjet paper, and it is paper such as copy paper having no ink receiving layer, which is used in offices or the like. The plain paper surface generally has a pH of 4 to 7.

The inkjet ink at 25° C. has a pH of 7 or more, preferably 8 or more, and more preferably 9 or more. In order to improve color-developing ability on the plain paper, as a method for forming aggregation and thickening at a pH of a plain paper surface so as to leave a colorant component on the paper surface, the pigment-containing water-insoluble vinyl polymer particles are prepared to form aggregation and thickening at less than pH 7. Thus, a recording ink is necessary to have a pH of 7 or more. However, a recording ink having a pH of 11 or more is more likely to threaten safety to human body (skin irritant property) or increase degradation of members used in an inkjet recording apparatus and the like The static surface tension of the inkjet ink at 25° C. is preferably 35 mN/m or less, and more preferably 32 mN/m or less. When the static surface tension is more than 35 mN/m, the ink penetration and leveling on the recording medium are hard to occur, thereby causing the extension of drying time.

The color of the inkjet ink of the present embodiment is not particularly limited and may be suitably selected in accordance with the intended use. For example, yellow, magenta, cyan and black are used. When recording is performed using an ink set in which two or more of the colors are used together, it is possible to form a multicolor image, and when recording is performed using an ink set in which all the colors are used together, it is possible to form a full-color image.

The inkjet ink of the present embodiment is used to form an image on an appropriate recording medium which will be explained later. Moreover, the inkjet ink of the present embodiment is not only used in an inkjet recording apparatus, in which recording and drying is performed at normal temperature, but also used in an inkjet recording apparatus having a function of heating a recording medium and the inkjet ink at 50° C. to 200° C. upon printing or before and after printing so as to promote fixing print. Further, the inkjet ink of the present embodiment can be preferably used in an ink cartridge, inkjet recording method, and inkjet recording apparatus and ink record of the present embodiment, which will be explained below.

<Recording Medium>

The recording medium used in the inkjet recording method of the present embodiment is not particularly limited and may be suitably selected in accordance with the intended use. Examples thereof include plain paper, gloss paper, special paper, cloth, films, OHP sheets and general-purpose printing paper. Of these, plain paper having a pH 7 or less is preferably used. These may be used alone or in combination. As the recording medium used in an image forming method of the present embodiment, plain paper having a sizing degree of 10 S or more and an air permeability of 5 S to 50 S, which is generally used as copy paper, is preferable. The recording medium may be subjected to pretreatment using a pretreatment liquid, which will be explained below.

—Pretreatment Liquid—

In the present invention, the pretreatment liquid used for a recording medium may be suitably selected in accordance with the purpose of an image formation using the inkjet ink, preferably in view of the physical properties of the inkjet ink. Specifically, the pretreatment liquid contains at least one selected from a cationic organic compound, a water-soluble organic acid and a water-soluble metal salt compound; a water-soluble organic solvent; and water, and further contains other compounds as necessary.

—Cationic Organic Compound—

The cationic organic compound used in the pretreatment liquid is not particularly limited and may be suitably selected in accordance with the intended use. Examples thereof include cationic polymers and cationic surfactants. As the cationic polymers, cationic polymer compounds of quaternary ammonium salts are preferably used. Examples thereof include dialkyl allyl ammonium chloride polymers, dialkyl aminoethyl (meth)acrylate quaternary ammonium salt polymers, modified polyvinyl alcohol dialkyl ammonium salt polymers and dialkyl diallyl ammonium salt polymers. Examples of the cationic polymer compounds include cationic specially-modified polyamine compounds, cationic polyamide polyamine compounds, cationic urea-formalin resin compounds, cationic polyacrylamide compounds, cationic alkyl ketene dimmers, cationic dicyandiamide compounds, cationic dicyandiamide-formalin condensation compounds, cationic dicyandiamide-polyamine condensation compounds, cationic polyvinyl formamide compounds, cationic polyvinyl pyridine compounds, cationic polyalkylene polyamine compounds and cationic epoxy polyamide compounds. Particularly preferable compounds are the following General Formulas (18) to (20):

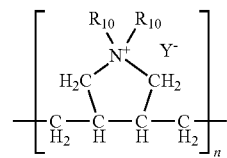

General Formula (18)

In General Formula (18), $R_{10}$ represents a methyl group or ethyl group; Y— represents a halogen ion; and n represents an integer.

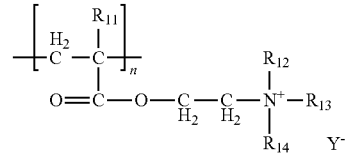

General Formula (19)

In General Formula (19), Y— represents an anion selected from a halogen ion, nitric acid ion, nitrous acid ion and acetic acid ion; $R_{11}$ represents H or CHs, $R_{12}$, $R_{13}$ and $R_{14}$ each represents H or an alkyl group; and n represents an integer.

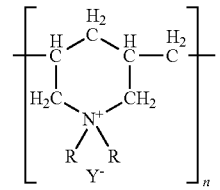

General Formula (20)

In General Formula (20), R represents a methyl group or ethyl group; Y— represents an anion selected from a halogen ion, nitric acid ion, nitrous acid ion and acetic acid ion; and n represents an integer.

Examples of the cationic surfactants preferably used in the present embodiment include a trimethylammonium salt containing a perfluoroalkyl group of a fluorine surfactant, a quaternary ammonium salt containing a perfluoroalkenyl group, and cationic starch.

—Water-soluble Organic Acid—

The water-soluble organic acid used in the pretreatment liquid is not particularly limited as long as an organic acid has water-solubility, and may be suitably selected in accordance with the intended use. Examples of the water-soluble organic acids which significantly enhance image quality include ascorbic acid (pKa: 4.17), aspartic acid (pKa: 1.88), citric acid (pKa: 3.13), tartaric acid (pKa: 2.93), gluconic acid (pKa: 2.2), glutamic acid (pKa: 2.2), succinic acid (pKa: 4.21), salicylic acid (pKa: 2.97), oxalic acid (pKa: 1.04), malic acid (pKa: 3.4), lactic acid (pKa: 3.83), pyruvic acid (pKa: 2.49), fumaric acid (pKa: 3.02), malonic acid (pKa: 2.05), adipic acid (pKa: 4.42), acetic acid (pKa: 4.76) and phytic acid. Additionally, salts of those organic acids are also effective on the enhancement of image quality.

—Water-soluble Metal Salt Compound—

The water-soluble metal salt compound used in the pretreatment liquid is not particularly limited as long as a metal salt has water-solubility, and may be suitably selected in accordance with the intended use. For example, water-soluble polyhydric metal salt compounds, and water-soluble monovalent alkali metal salt compounds are exemplified in terms of outstanding effect in image quality enhancement. Examples of the water-soluble polyhydric metal salt compounds include magnesium sulfate, aluminum sulfate, manganese sulfate, nickel sulfate, iron(II)sulfate, copper(II)sulfate, zinc sulfate, iron(II)nitrate, iron(III)nitrate, cobalt nitrate, strontium nitrate, copper(II)nitrate, nickel(II)nitrate, lead(II)nitrate, manganese(II)nitrate, nickel(II)chloride, calcium chloride, tin(II)chloride, strontium chloride, barium chloride, and magnesium chloride. Examples of the water-soluble monovalent alkali metal salt compounds include sodium sulfate, potassium sulfate, lithium sulfate, sodium hydrogen sulfate, potassium hydrogen sulfate, sodium nitrate, potassium nitrate, sodium carbonate, potassium carbonate, sodium hydrogen carbonate, potassium hydrogen carbonate, sodium chloride, and potassium chloride.

In the pretreatment liquid, the amount of the at least one selected from the group consisting of the cationic organic compound, the water-soluble organic acid and the water-soluble metal salt compound is not particularly limited. It is generally 0.1% by mass to 50% by mass, and more preferably 5% by mass to 30% by mass, based on the mass of the pretreatment liquid. When the amount of the compound is more than 50% by mass, the compound may be separated out during storage or coating of the pretreatment liquid. When the amount of the compound is less than 0.1% by mass, effect in image quality enhancement may be decreased.

Any of the cationic polymer, the cationic surfactant, the water-soluble organic acid, and the water-soluble metal salt compound induces aggregation of the pigment-containing water-insoluble vinyl polymer particles which are contained in the inkjet ink, so as to leave the colorant on a surface of a recording medium, thereby increasing image density and preventing feathering. Moreover, depending on types and properties of recording media, however, a water-soluble organic acid having a pKa of 5 or less significantly enhances image quality.

—Water-soluble Organic Solvent—

As a water-soluble organic solvent in the pretreatment liquid, the water-soluble organic solvent used in the inkjet ink is preferably used. Particularly, the water-soluble organic solvent A used in the inkjet ink is preferable in terms of moisture retention. The amount of the water-soluble organic solvent in the pretreatment liquid is not particularly limited. It is generally 10% by mass to 80% by mass, and preferably 15% by mass 60% by mass. When the amount of the water-soluble organic solvent is more than 80% by mass, a recording medium which has been pretreated may not be sufficiently dried depending on the types of the water-soluble organic solvent. When the amount of the water-soluble organic solvent is less than 10% by mass, water evaporation occurs in the pretreatment liquid application step or the like, and the composition of the pretreatment liquid may be largely changed.

—Surfactant—

The static surface tension depends of the application method of the pretreatment liquid. However, the static surface tension of the pretreatment liquid is preferably adjusted to 30 mN/m or less. It is more preferably adjusted in a range of 20 mN/m to 30 mN/m, so that the wettability of a surface of a recording medium is improved so as to enhance image quality, i.e. improved color saturation and less white spots. In order to adjust the static surface tension of the pretreatment liquid within a range of 20 mN/m to 30 mN/m, a silicone surfactant or a fluorine surfactant is preferably used. These surfactants may be used alone or in combination. As a fluorine surfactant used in the pretreatment liquid of the present embodiment, the fluorine surfactant used in the inkjet ink is preferably used. As the silicone surfactant used in the pretreatment liquid of the present embodiment, the silicone surfactant used in the inkjet ink is preferably used. The amount of the surfactant in the pretreatment liquid is not particularly limited. It is generally 0.01% by mass to 10% by mass, and preferably 0.1% by mass to 5% by mass. When the amount of the surfactant is more than 10% by mass, it is not preferable in terms of cost. When the amount of the surfactant is less than 0.01% by mass, the wettability of a recording medium may not be improved.

—Other Components—

The pretreatment liquid may contain the antiseptic/antifungal agent, the chelating reagent, the antirust agent, the antioxidizing agent or the like used in the inkjet ink may be appropriately used as necessary.

(Ink Cartridge)

The ink cartridge of the present embodiment includes the inkjet ink of the present invention housed in a container, and further includes other members which are suitably selected as necessary. The container is not particularly limited, and the shape, structure, size, material and the like thereof may be suitably selected in accordance with the intended use. Suitable examples thereof include a container having an ink bag or the like formed of an aluminum laminated film, resin film, etc.

Figure 2:
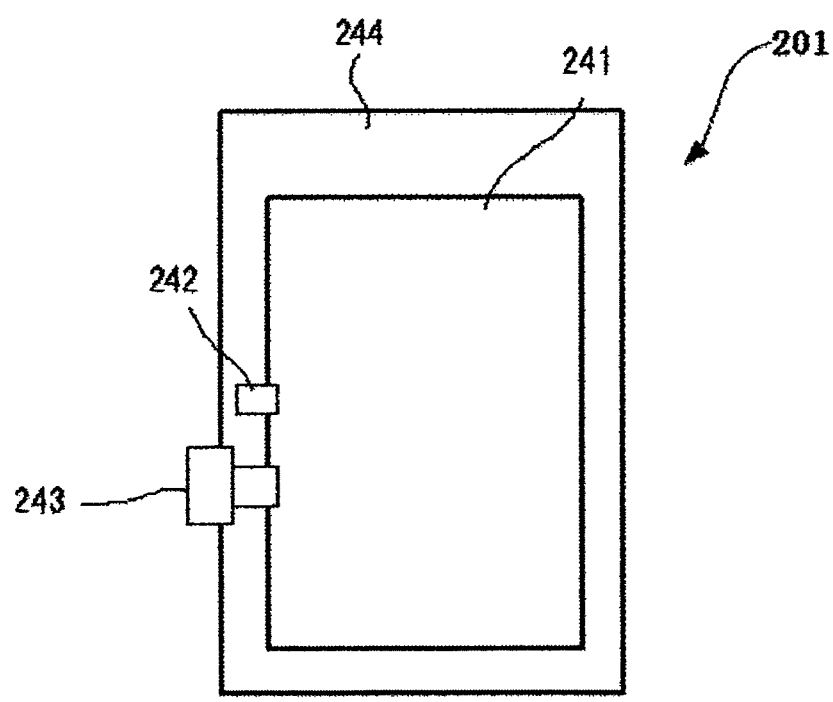
FIG. 2 is a schematic view showing a modified example of the ink cartridge shown in FIG. 1.

Next, the ink cartridge will be explained with reference to FIGS. 1 and 2. Here, FIG. 1 is a schematic view showing an example of the ink cartridge of the present invention, and FIG. 2 is a schematic view showing a modified example of the ink cartridge shown in FIG. 1. As shown in FIG. 1, the inkjet ink of the present invention is supplied from an ink inlet 242 into an ink bag 241, and the ink inlet 242 is closed by means of fusion bonding after air is discharged. When the ink cartridge is used, an ink ejection outlet 243 made of a rubber member is pricked with a needle of an inkjet recording apparatus main body 101 later described with reference to FIG. 3, and the ink is thus supplied to the apparatus main body 101.

The ink bag 241 is formed of an air-impermeable packing member such as an aluminum laminated film. As shown in FIG. 2, this ink bag 241 is normally housed in a plastic cartridge case 244 and detachably mounted on a variety of inkjet recording apparatuses.

The ink cartridge 201 of the present embodiment houses the inkjet ink of the present invention and can be detachably mounted on a variety of inkjet recording apparatuses. It is particularly desirable that the ink cartridge 201 be detachably mounted on the inkjet recording apparatus of the present invention described later.

(Inkjet Recording Method and Inkjet Recording Apparatus)

The inkjet recording method of the present invention includes an ink jetting step of applying a stimulus to the inkjet ink of the present invention so as to jet the inkjet ink, thereby forming an image on a suitable recording medium described later. The inkjet recording method further includes other steps such as a stimulus generating step and a controlling step, as necessary. The inkjet recording apparatus of the present invention includes at least an ink jetting unit, and further includes other units such as a stimulus generating unit and a controlling unit, which are suitably selected as necessary. The inkjet recording method of the present invention can be suitably performed by the inkjet recording apparatus of the present invention, and the ink jetting step can be suitably performed by the ink jetting unit. Also, the other steps can be suitably performed by the other units.

—Ink jetting Step and Ink Jetting Unit—

The ink jetting step is a step of applying a stimulus (energy) to the inkjet ink of the present invention so as to jet the inkjet ink, thereby forming an image on the above-mentioned recording medium. The ink jetting unit is a unit configured to apply a stimulus (energy) to the inkjet ink of the present invention so as to jet the inkjet ink, thereby forming an image on a recording medium. The ink jetting unit is not particularly limited, and examples thereof include nozzles for ejecting ink.

In the present embodiment, at least part of a liquid chamber, a fluid resistance unit, a diaphragm and a nozzle member of the inkjet head is preferably formed of a material containing at least either silicone or nickel. Also, the inkjet nozzle has a diameter of preferably 30 μm or less, more preferably 1 μm to 20 μm.

The stimulus (energy) can be generated by the stimulus generating unit, and the stimulus is not particularly limited and may be suitably selected in accordance with the intended use. Examples thereof include heat (temperature), pressure, vibration and light. These may be used alone or in combination. Of these, heat and pressure are suitable.

Figure 3:
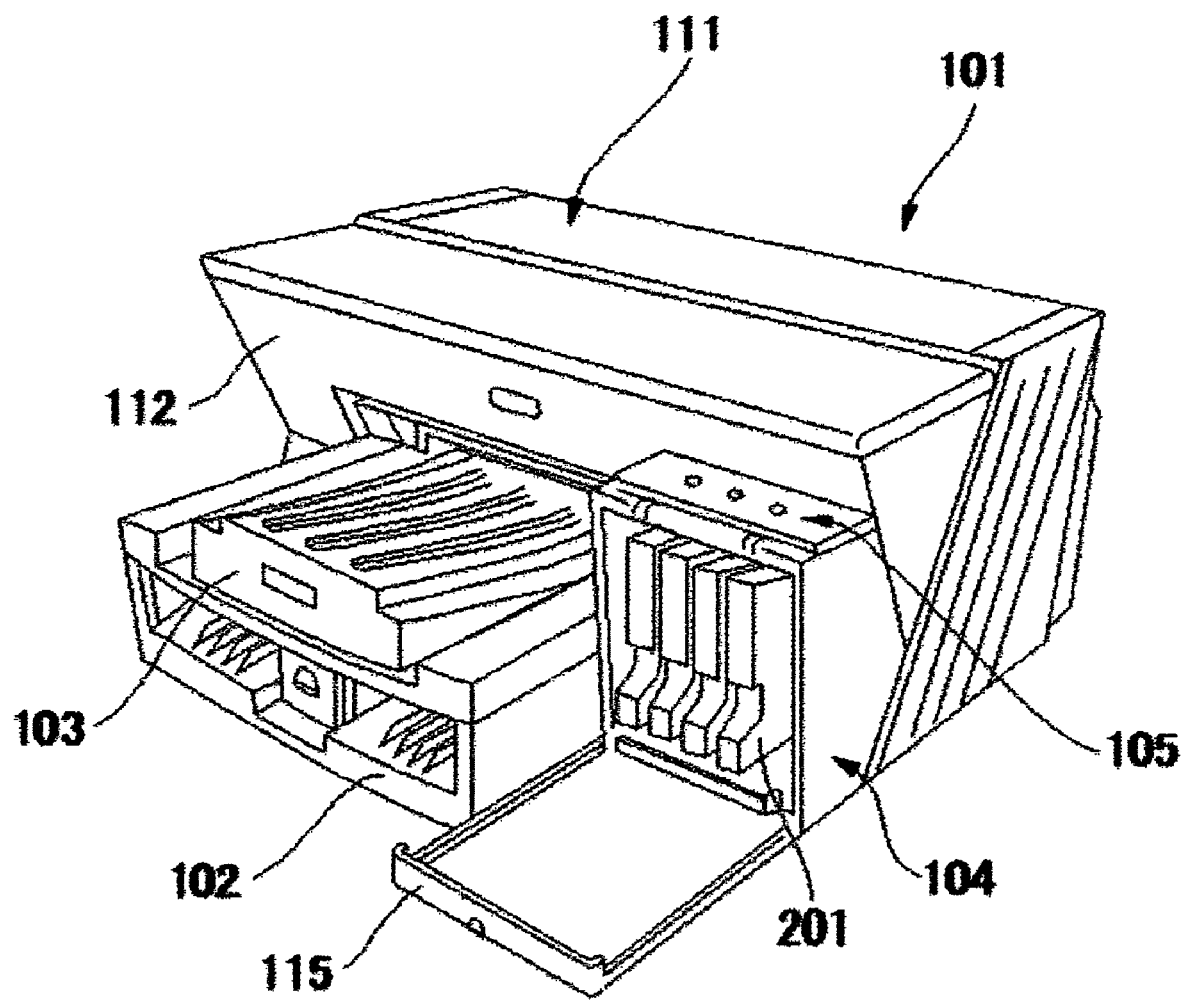
FIG. 3 is a perspective view showing an example of an inkjet recording apparatus with a cover for an ink cartridge-loading section opened.

Here, one aspect of performing the inkjet recording method of the present invention by a serial-type inkjet recording apparatus is explained with reference to the drawings. The inkjet recording apparatus in FIG. 3 includes an apparatus main body 101, a paper feed tray 102 for feeding paper into the apparatus main body 101, a paper discharge tray 103 for storing paper which has been fed into the apparatus main body 101 and on which images have been formed (recorded), and an ink cartridge loading section 104. An operation unit 105 composed of operation keys, a display and the like is placed on the upper surface of the ink cartridge loading section 104. The ink cartridge loading section 104 has a front cover 115 capable of opening and closing to attach and detach the ink cartridge 201. In FIG. 3, 111 denotes an upper cover arranged over the apparatus main body 101, and 112 denotes a front surface of the apparatus main body 101.

Figure 4:
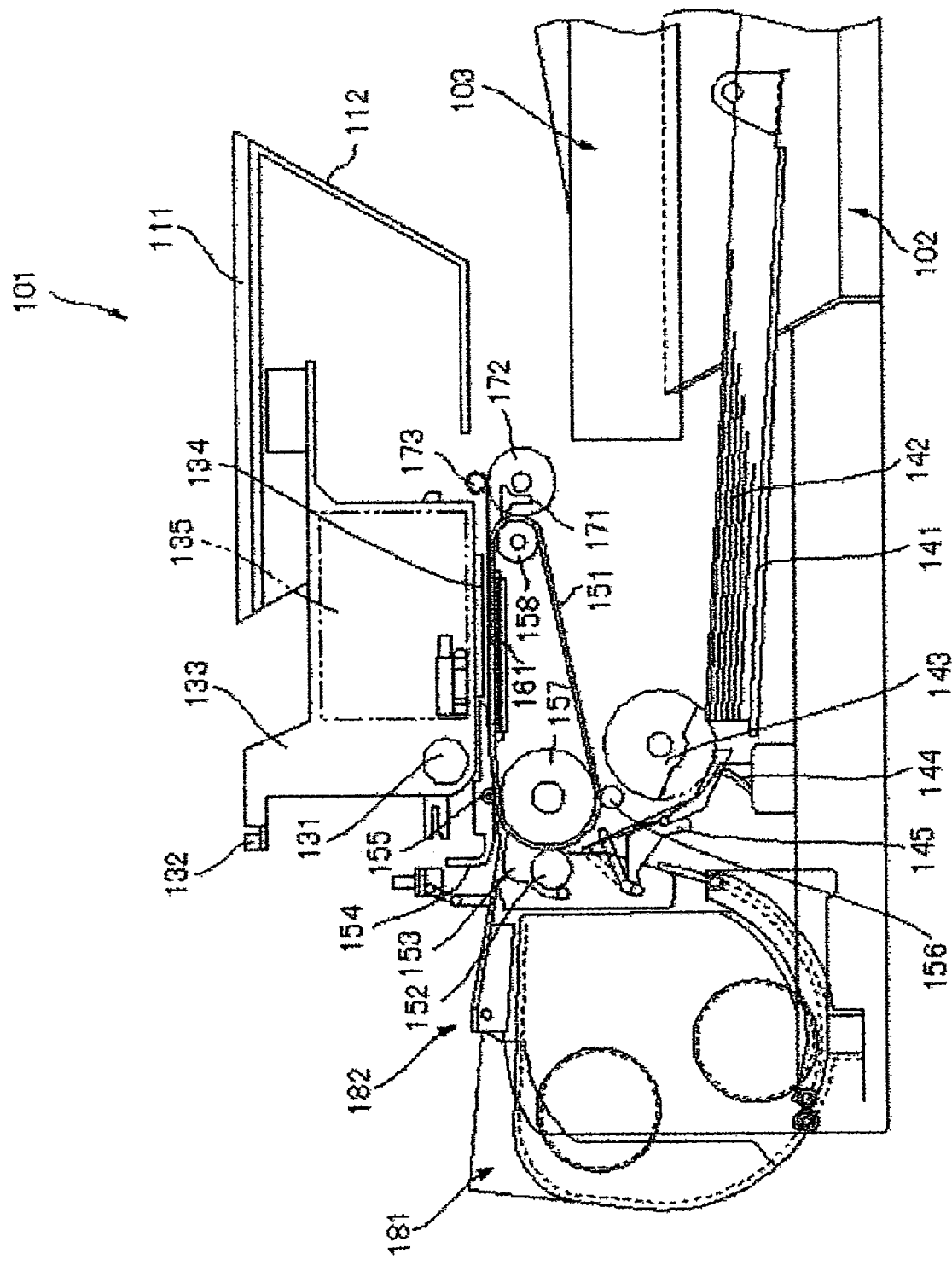
FIG. 4 is a cross-sectional view showing an example of the entire configuration of an inkjet recording apparatus shown in FIG. 3.
Figure 5:
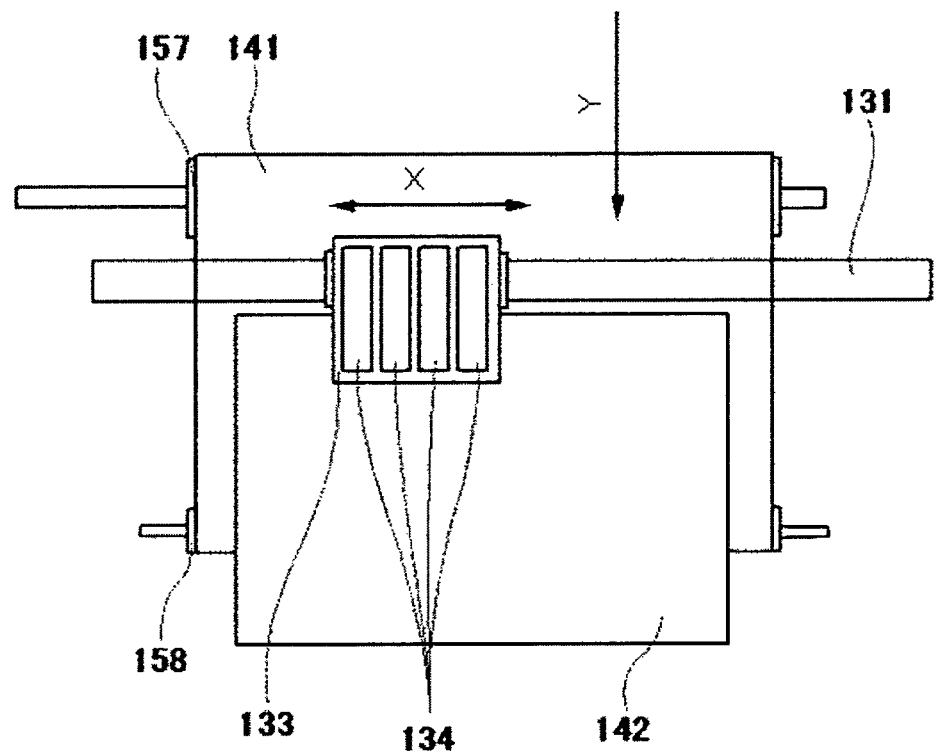
FIG. 5 is a schematic enlarged view showing an inkjet head used in the present invention.

In the apparatus main body 101, as shown in FIGS. 4 and 5, a carriage 133 is freely slidably held in the main scanning direction by a guide rod 131, which is a guide member laterally passed between left and right side plates (not shown), and a stay 132; and the carriage 133 is moved for scanning in the arrow direction in FIG. 5 by a main scanning motor (not shown).

A recording head 134 composed of four inkjet recording heads which eject recording ink droplets of yellow (Y), cyan (C), magenta (M) and black (Bk) is installed in the carriage 133 such that a plurality of ink ejection outlets are aligned in the direction intersecting the main scanning direction and that the ink droplet ejection direction faces downward.

For each of the inkjet recording heads composing the recording head 134, it is possible to use a head provided with any of the following actuators as a energy-generating unit for ejecting ink: a piezoelectric actuator such as a piezoelectric element, a thermal actuator that uses a thermoelectric conversion element such as an exothermic resistive element and utilizes phase change caused by film boiling of a liquid, a shape-memory-alloy actuator that utilizes metal phase change caused by temperature change, and an electrostatic actuator that utilizes electrostatic force.

Figure 6:
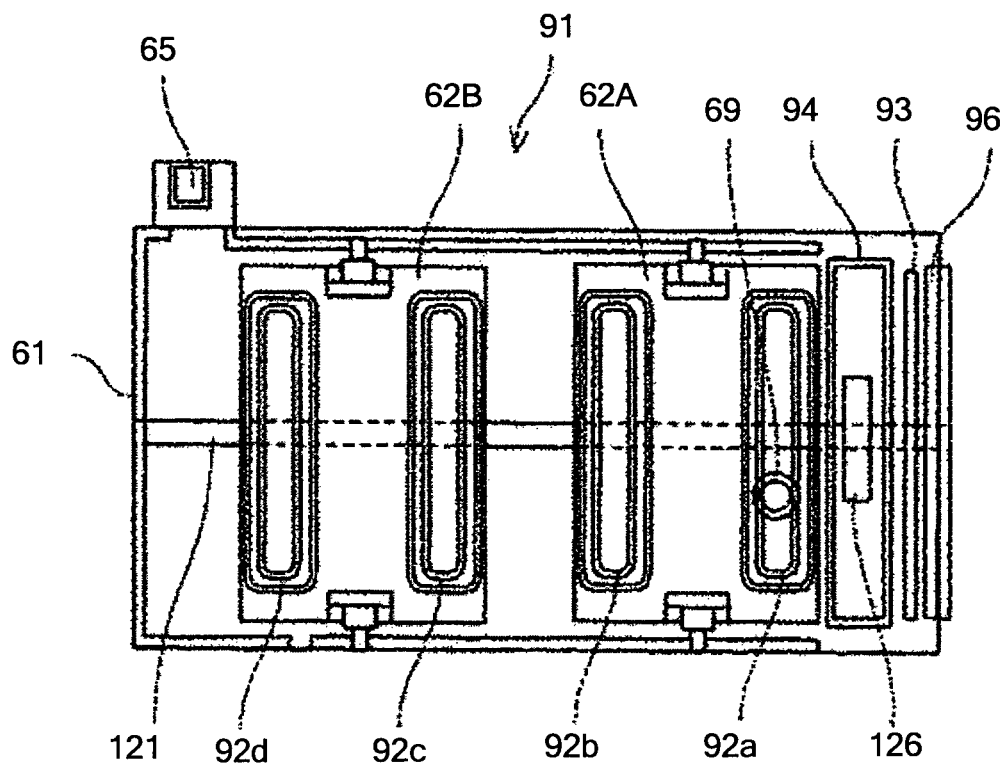
FIG. 6 is a plane view for explaining main parts of an example of a subsystem including a maintenance device for an ejection device according to the present invention.
Figure 7:
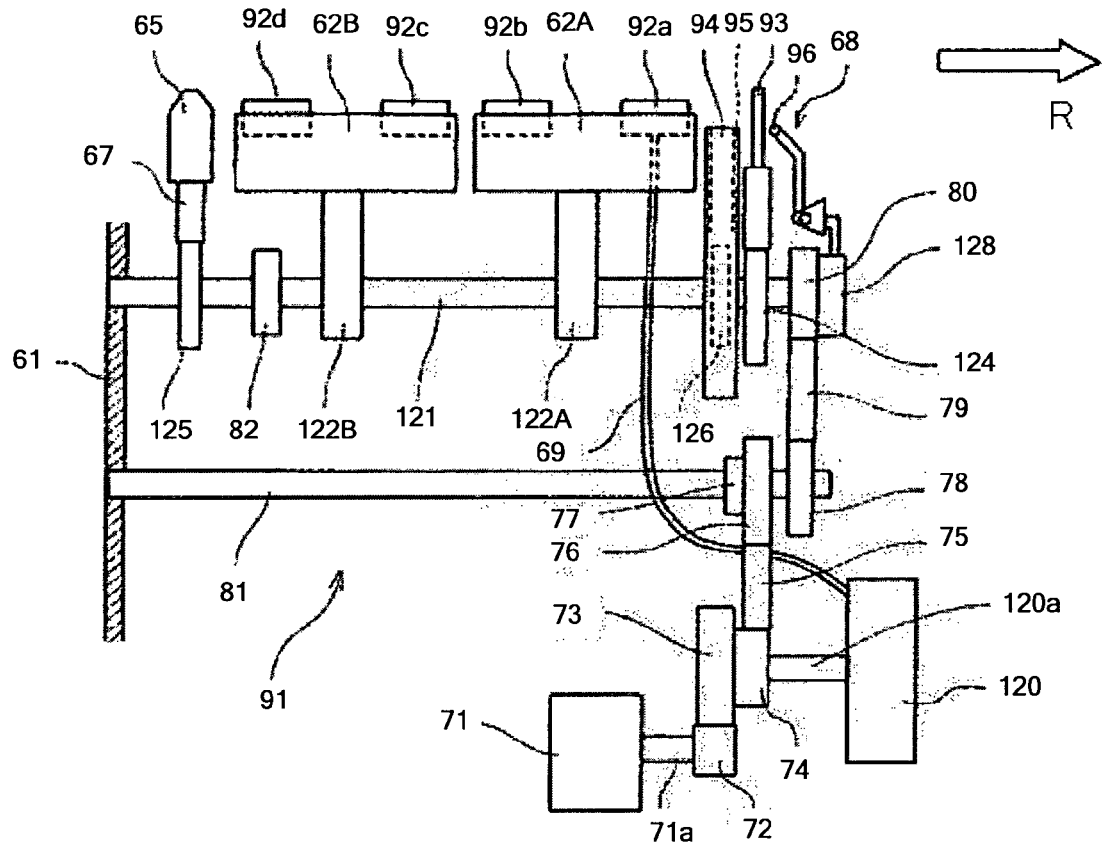
FIG. 7 is a schematic structural diagram of the subsystem shown in FIG. 6.
Figure 8:
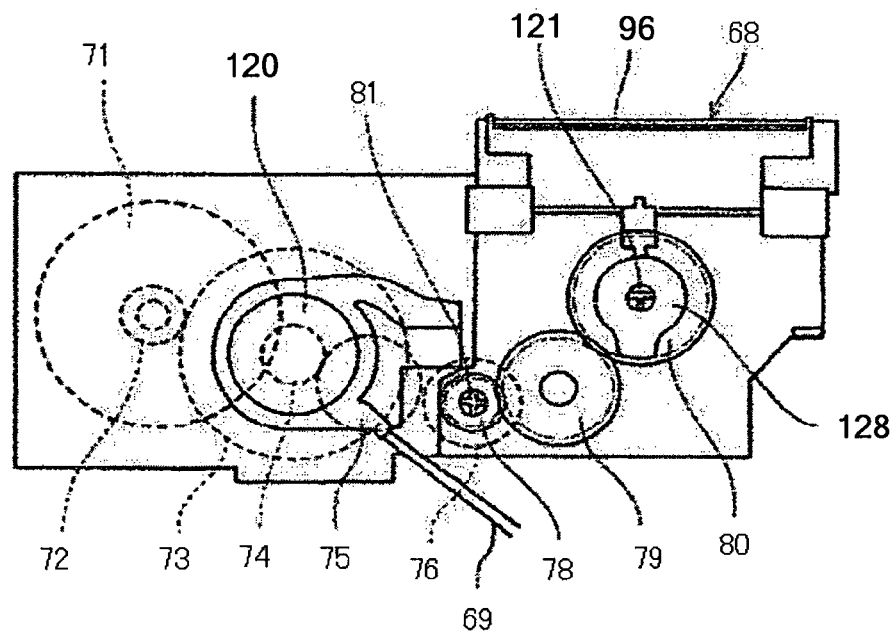
FIG. 8 is a diagram for explaining the right side of the subsystem shown in FIG. 6.

Here, a structural example of a subsystem 91 including the maintenance device for the ejection device according to the present embodiment is explained with reference to FIGS. 6 to 8. FIG. 6 is a plan view for explaining main parts of the subsystem 91, FIG. 7 is a schematic structural diagram of the subsystem 91, and FIG. 8 is a diagram for explaining the right side of the subsystem 91 in FIG. 6.

Two cap holders 62A and 62B serving as a cap holding mechanism, a wiper blade 93 serving as a wiping member including an elastic body as a cleaning unit, and a carriage lock 65 are held in a frame (maintenance device frame) 61 of this subsystem in such a manner as to be able to ascend and descend (move up and down). Additionally, an idle ejection receiver 94 is placed between the wiper blade 93 and the cap holder 62A, and a wiper cleaner 68 serving as a cleaner unit including a cleaner roller 96 that is a cleaning member for pressing the wiper blade 93 from outside the frame 61 toward a wiper cleaner 95, which is a cleaning member for the idle ejection receiver 94, is oscillatably held to clean the wiper blade 93.

(Image Forming Method)

The image forming method of the present embodiment includes a pretreatment step of applying the above-mentioned pretreatment liquid to above-mentioned recording medium, and an ink jetting step. In the pretreatment step, the pretreatment liquid is uniformly applied onto a surface of a recording medium by various coating method. The pretreatment exhibits outstanding effect on a sufficiently dried or not dried surface of the recording medium.

The coated amount of the pretreatment is preferably 0.1 $g/m^2$ to 10 $g/m^2$, and more preferably 0.2 $g/m^2$ to 5 $g/m^2$ on a dry basis. When the coated amount on a dry basis is less than 0.1 $g/m^2$, an image quality, such as image density, color saturation, feathering and white spots, is hardly improved. When it is more than 10 $g/m^2$, the image quality may not be further improved, and it is not economically preferable.

In the pretreatment step, the coating method is not particularly limited as long as the pretreatment liquid can be uniformly coated on a surface of a recording medium. Examples thereof include blade coating, gravure coating, gravure offset coating, bar coating, roll coating, knife coating, air knife coating, comma coating, U-comma coating, AKKU coating, smoothing coating, micro gravure coating, reverse roll coating, 4-roll or 5-roll coating, dip coating, curtain coating, slide coating and die-coating.

After the pretreatment liquid is coated, a drying step is performed as necessary. The drying step is not particularly limited as long as the recording medium which has been subjected to pretreatment using the pretreatment liquid can be properly dried. For example, drying by a roll heater or drum heater, or warm air drying is preferred.

In the ink jetting step in the image forming method of the present embodiment, conventionally known various inkjet recording method can be used. However, the ink jetting step of the inkjet recording method of the present invention is preferably used.

Figure 9:
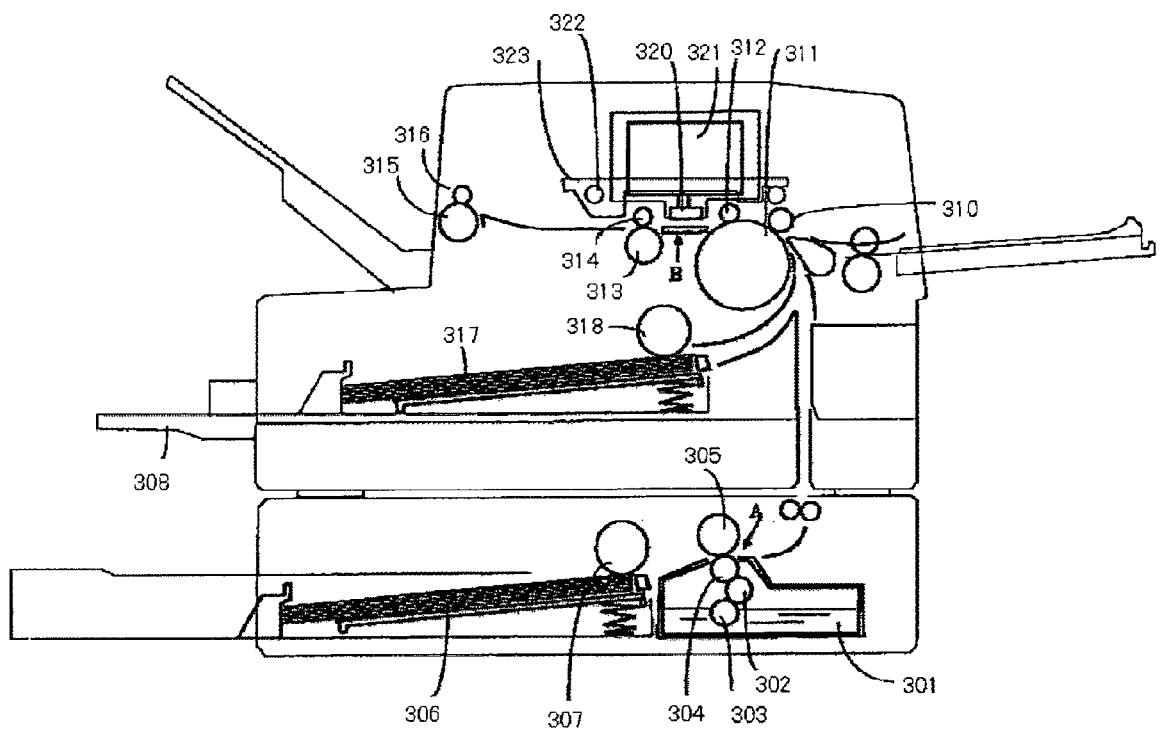
FIG. 9 is a side cross-sectional view of an example of an apparatus of an embodiment of the present invention.

Here, a specific example of an apparatus for achieving an image forming method of the present embodiment will be explained with reference to FIGS. 9 and 10. An apparatus shown in FIG. 9 is a recording apparatus for forming an image by scanning an inkjet recording head. FIG. 9, a recording medium 306 is fed by a paper feed roller 307, and a pretreatment liquid 301 is uniformly and thinly applied on the recording medium 306 by an applicator roller 304 and a counter roller 305. The pretreatment liquid 301 is drawn by a drawing roller 303 and then uniformly applied to the applicator roller 304 while the thickness is controlled by a thickness controlling roller 302. The recording medium 306 is fed to a recording scanning section including an inkjet recording head 320 while being applied with the pretreatment liquid 301. The distance between a pretreatment end point (i.e., a point A in FIG. 9) and a starting point of record scanning (i.e., a point B in FIG. 9) is longer than the length of the recording medium 306 in the feeding direction. Therefore when the tip edge of the recording medium 306 reaches the starting point of record scanning B, the pretreatment operation has been completed. In this case, the pretreatment operation has been completed before the recording medium 306 is intermittently fed such that images are recorded thereon by scanning the inkjet recording head 320. Namely, the pretreatment liquid 301 can be applied continuously on the recording medium 306 at a constant speed. Therefore, the pretreatment liquid 301 can be uniformly applied on the recording medium 306. In the recording apparatus shown in FIG. 9, the recording medium 306 on which the pretreatment liquid 301 is to be applied is set in the lower cassette. A recording medium 317 on which the pretreatment liquid 301 need not or should not to be applied is set in the upper cassette. Therefore, it is advantageous to provide the distance between the cassette and the recording portion long enough to apply the pretreatment liquid 301. In FIG. 9, 308 denotes a paper feed tray for stacking a recording medium, 310 denotes a paper feed roller for feeding a recording medium from the paper feed tray 308 to a recording medium feed roller 312, 313, 314, 315 and 316 denote recording medium feed rollers for feeding a recording medium, 318 denotes a paper feed roller for feeding a recording medium to the recording medium feed roller, 322 denotes a carriage axis, 323 denotes a cartridge, and 321 denotes an ink cartridge.

Figure 10:
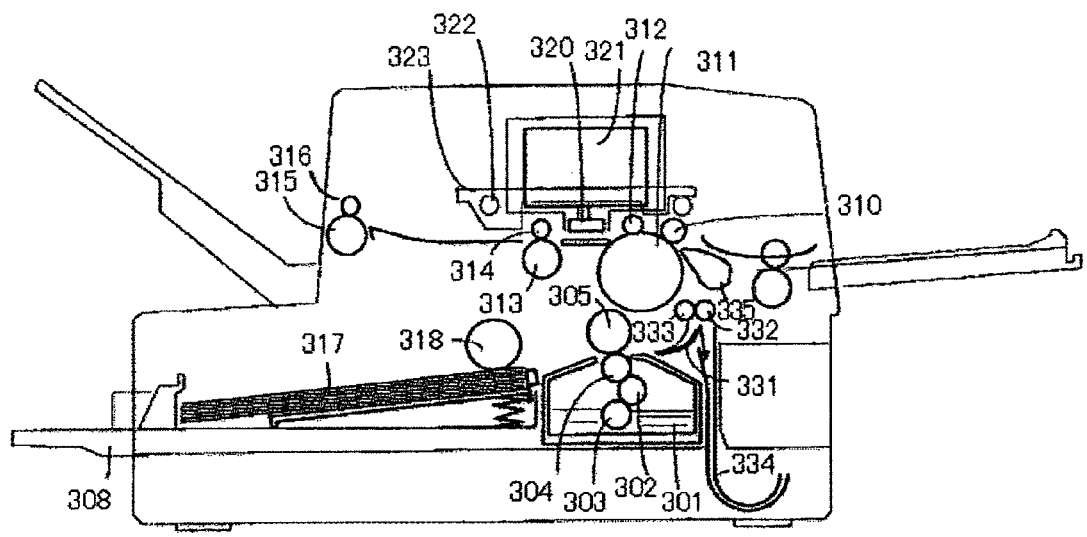
FIG. 10 is a side cross-sectional view of an example of an apparatus of another embodiment of the present invention.

FIG. 10 shows another example of an apparatus for achieving an image forming method of the present embodiment. An example of the apparatus shown in FIG. 10 is also a recording apparatus in which an image is recorded by scanning an inkjet recording head. This recording apparatus is more compact than the recording apparatus shown in FIG. 9. A recording medium 317 is fed by a paper feed roller 318, and a pretreatment liquid 301 is uniformly and thinly applied on the recording medium 317 by an applicator roller 304 and a counter roller 305. The pretreatment liquid 301 is drawn by a drawing roller 303 and is uniformly applied to the applicator roller 304 by a thickness controlling roller 302. The recording medium 317 is fed while being applied with the pretreatment liquid 301 and passes through a recording scanning portion having an inkjet recording head 320. The recording medium 317 is fed until the recording medium 317 is completely subjected to the pretreatment. When the pretreatment is completed, the recording medium 317 is returned such that the leading edge of the recording medium 317 is located at the starting position of record scanning. The completion of the pretreatment operation can be determined, for example, by detecting the recording medium 317 using a known detector (not shown) provided at the exit of the pretreatment liquid application device. This detector is not necessary to be provided. Alternatively, information about the length of the recording medium 317 is preliminarily input to a controller and the rotation number of the motor which drives the feeding rollers is controlled such that the feed par revolution of the circumference of the feeding roller for the recording medium 317 corresponds to the length of the recording medium 317. In FIG. 10, 333 denotes a recording medium feed roller, and 335 denotes a paper feed guide, and other reference numerals are as referred in FIG. 9.

The recording medium 317 on which the pretreatment liquid 301 has been applied, is again fed to the recording scanning position before the pretreatment liquid is dried and solidified, wherein the recording medium 317 is intermittently fed in synchronization with scanning by means of an inkjet recording head 320. If the recording medium 317 is returned through the same passage through which the recording medium 317 has been fed, the rear edge of the recording medium 317 goes into the pretreatment liquid application device and thereby problems such that the recording medium 317 is contaminated by the pretreatment liquid, unevenly applied with the pretreatment liquid 301 or jammed at the device occur. Therefore, when the recording medium 317, on which the pretreatment liquid 301 has been applied, is returned, the passage of the recording medium 317 is changed by a recording medium guide 331. Namely, the position of the recording medium guide 331 is changed to the position illustrated by a dotted line using a known means such as a solenoid or a motor, such that the recording medium 317 is returned through a guide for return 334. Thus the problems mentioned above can be avoided.

The pretreatment liquid application step is preferably performed continuously at a constant linear velocity of 10 mm/s to 1,000 mm/s. In the recording apparatus shown in FIG. 10, after the pretreatment liquid application step is performed on a sheet of a recording medium, the image recording step is started for the sheet by means of an inkjet recording method. In this case, since the speed of the pretreatment liquid application step is generally different from that of the image recording step, the time between the tip edge of the sheet is applied with the pretreatment liquid and an image is recorded on the tip edge is different from the time for the rear edge of the sheet. Even in a case such that this time difference is fairly large, since the pretreatment liquid includes a large amount of a hydrophilic solvent having a higher boiling point than water and a low evaporating speed and in addition the water content of the pretreatment liquid is controlled so as to be almost equal to the equilibrium water content of the air in the environment where the printer is used, the evaporation of water in the pretreatment liquid can be fairly prevented. Therefore, the difference in image qualities between the tip edge of a recording sheet and the rear edge thereof is so little as not to be visually detected.

As can be understood from the step of transferring a recording medium in this apparatus, the recording medium on which the pretreatment liquid has been applied is often necessary to be fed by means of contact-feeding elements such as a roller, a guide, etc. for image formation. In this case, when the pretreatment liquid applied on the recording medium is adhered onto the feeding members, a feeding failure occurs or a problem occurs in that the image quality is lowered due to contamination of the feeding members. In order to avoid such problems, from the standpoint of the apparatus, it is preferable to use a waved guide plate and a guide roller with a spur. In addition, it is also preferable that the surface of a roller is formed of a water repellant material.

However, it is important that the pretreatment liquid applied on the recording medium is rapidly absorbed therein such that the surface of the recording medium is dried in appearance. In order that the recording medium applied with a pretreatment liquid achieves such a state, the pretreatment liquid preferably has a surface tension of 40 mN/m or less so as to immediately penetrate into the recording medium. The passage "the pretreatment liquid is dried and solidified" after the pretreatment liquid has been applied on the recording medium means that the pretreatment liquid applied is solidified after the liquid components therein have evaporated and cannot be maintained in the liquid state, but does not mean that the pretreatment liquid applied on a recording medium appears to be dried in appearance because of being absorbed in the recording medium. By using such recording apparatus as mentioned above which include a combination of a pretreatment liquid application device and an image recording device, the inkjet recording can be performed on a recording medium in which the pretreatment liquid is penetrated and the surface of the recording medium is dried in appearance, but the pretreatment liquid is not solidified. Therefore, even when the pretreatment liquid is applied in a relatively small amount, the image quality can be outstandingly improved.

In order to control the operation of the image recording apparatuses as shown in FIGS. 9 and 10, when a print order is received by a host machine such as a personal computer, the image recording apparatus (including the pretreatment applicator) starts to perform preliminary operations (i.e., a pretreatment liquid application step and a head cleaning step at the same time). After completion of the preliminary operations, the image recording apparatus starts to perform an image recording operation. At the data transmitting operation, the image data transmitted per one time may be the data corresponding to one scanning line images, plural scanning line images, or one page images. The head cleaning operation and ink-discharging check operation are not necessarily performed. In addition, it is not necessary to sequentially perform the head cleaning and ink-discharging check operations, and the image data processing and image data transmission operations. Namely, it is possible to perform in parallel the pretreatment, head cleaning, ink-discharging check, image data processing and image data transmission operations. By performing these operations in parallel, images can be recorded without substantially deteriorating throughput of the image recording apparatus even when the pretreatment liquid application step is performed.

(Ink Record)

The ink record used in the present invention includes an image formed on a recording medium, using the inkjet ink of the present embodiment. The ink record has high image quality, is free of bleeding and superior in temporal stability and can be suitably used for a variety of purposes as a material on which letters/characters or images of any type are recorded, or the like.

EXAMPLES

Hereinafter, the present invention will be specifically explained with reference to Examples and Comparative Examples, which however shall not be construed as limiting the scope of the present invention. All part(s) are by mass unless indicated otherwise.

Production Examples 1 to 6

In a reaction vessel, 20 parts of methyl ethyl ketone, 0.03 parts of a polymerization chain transfer agent (2-mercaptoethanol), and 10% by mass of each monomer (based on parts by mass) shown in column (A) of Table 1 were loaded and mixed, and then the reaction vessel was sufficiently purged with nitrogen, thereby obtaining a mixed solution.

Separately, in a dropping funnel, each of monomers shown in columns (B) and (C) of Table 1 (based on parts by mass) were loaded with the amounts respectively shown in Table 1, and the following components were added and mixed therein, and then the dropping funnel was sufficiently purged with nitrogen, thereby obtaining a mixed solution.

| | |
|---|---|
| polymerization chain transfer agent (2-mercaptoethanol) | 0.27 parts |
| methyl ethyl ketone | 60 parts |
| 2,2'-azobis(2,4-dimethylvaleronitrile) | 1.2 parts |

In a nitrogen atmosphere, the temperature of the mixed solution inside the reaction vessel was raised to 75° C. while the mixed solution was stirred, and the mixed solution in the dropping funnel was gradually dripped in the reaction vessel for 3 hours. After the dripping was finished, the temperature of the mixed solution was kept at 75° C. for 2 hours, and then a solution obtained by dissolving 0.3 parts of 2,2'-azobis(2, 4-dimethylvaleronitrile) in 5 parts of methyl ethyl ketone was added in the mixed solution, and then this mixed solution was further matured at 75° C. for 2 hours, and at 85° C. for 2 hours, thereby obtaining a polymer solution.

A part of the obtained polymer solution was dried under reduced pressure at 105° C. for 2 hours to remove the solvent, thereby isolating a polymer. The weight average molecular weight of the polymer was measured by gel permeation chromatography using a polystyrene as a standard reference material and 60 mmol/L of phosphoric acid and 50 mmol/L of lithium bromide-containing dimethylformamide as solvents.

The compounds shown in Table 1 are specifically as follows:

Ethoxypolyethylene glycol monomethacrylate: a monomer expressed by General Formula (1), where n represents 9, $R_1$ represents a methyl group, $R_2$ represents an ethylene group, and $R_3$ represents an ethyl group;

Octoxypolyethylene glycol monomethacrylate: a monomer expressed by General Formula (1), where n represents 6, $R_1$ represents a methyl group, $R_2$ represents an ethylene group, and $R_3$ represents an octyl group;

Octoxypolyethylene glycol-polypropylene glycol monomethacrylate: a monomer expressed by General Formula (1), where n represents 6 (the average number of moles added of polyethylene glycol=4, the average number of moles added of polypropylene glycol=2), $R_1$ represents a methyl group, $R_2$ represents an ethylene group and a propylene group, and $R_3$ represents an octyl group, and in which an oxyethylene group and an oxyethylenepropylene group are randomly added;

Lauroxypolyethylene glycol monomethacrylate: a monomer expressed by General Formula (1), where n represents 4, $R_1$ represents a methyl group, $R_2$ represents an ethylene group, and $R_3$ represents a dodecyl group;

Stearoxypolyethylene glycol monomethacrylate: a monomer expressed by General Formula (1), where n represents 9, $R_1$ represents a methyl group, $R_2$ represents an ethylene group, and $R_3$ represents an octadecyl group;

Polyethylene glycol monomethacrylate: a monomer expressed by General Formula (1), where n represents 15, $R_1$ represents a methyl group and $R_2$ represents an ethylene group, and $R_3$ represents a hydrogen atom;

Methacrylic acid: GE-110 (MAA), manufactured by Mitsubishi Gas Chemical Company, Inc.;

2-ethylhexyl methacrylate: acryl ester EH, manufactured by Mitsubishi Rayon Co., Ltd.;

Styrene monomer: styrene monomer manufactured by NIPPON STEEL CHEMICAL CO., LTD.;

Styrene macromer: AS-6S (Styrene Macromer), manufactured by Toagosei Co., Ltd., a number average molecular mass of 6,000.

TABLE 1

| Monomer | | Production Example | | | | | |
|---|---|---|---|---|---|---|---|
| | | 1 | 2 | 3 | 4 | 5 | 6 |
| (A) | Ethoxypolyethylene glycol monomethacrylate | 10 | 0 | 0 | 0 | 0 | 0 |
| | Octoxypolyethylene glycol monomethacrylate | 0 | 10 | 0 | 0 | 0 | 0 |
| | Octoxypolyethylene glycol-polypropylene glycol monomethacrylate | 0 | 0 | 10 | 0 | 0 | 0 |
| | Lauroxypolyethylene glycol monomethacrylate | 0 | 0 | 0 | 10 | 0 | 0 |
| | Stearoxypolyethylene glycol monomethacrylate | 0 | 0 | 0 | 0 | 10 | 0 |
| | Polyethylene glycol monomethacrylate | 0 | 0 | 0 | 0 | 0 | 10 |
| (B) | Methacrylic acid | 12 | 12 | 14 | 14 | 14 | 12 |
| (C) | 2-ethylhexyl methacrylate | 22 | 22 | 20 | 20 | 20 | 22 |
| | Styrene monomer | 46 | 46 | 46 | 46 | 46 | 46 |
| | Styrene macromer | 10 | 10 | 10 | 10 | 10 | 10 |
| | Weight average molecular weight | 3,200 | 4,100 | 4,000 | 3,000 | 3,200 | 4,000 |
| | Neutralization degree | 90 | 90 | 90 | 90 | 90 | 90 |

Preparation Examples 1 to 8

In Preparation Examples 1 to 8, each of the polymer solutions and pigments shown in Table 2 were combined and prepared as follows: in 77 parts of a solution prepared by dissolving each polymer solution obtained in Production Examples 1 to 6 in methyl ethyl ketone in a proportion of 50% of the polymer solution therein, 90 parts of methyl ethyl ketone and a certain amount of a neutralizing agent (5N aqueous sodium hydroxide solution) were added so as to neutralize methacrylic acid, i.e. a neutralization degree of 90%, and then 370 parts of ion-exchanged water and 90 parts of the pigment shown in Table 2 as a colorant were further added and dispersion mixed, and further treated using a dispersion machine (MICROFLUIDIZER M-140K, 150 MPa, manufactured by Microffluidics) in 20 passes. Meanwhile, in the case where carbon black NIPEX 150 was used, dispersion was performed in 5 passes.

In the obtained water dispersion, 100 parts of ion-exchanged water was added and stirred, and then methyl ethyl ketone was removed under reduced pressure at 60° C., and a part of water was further removed. The resulted dispersion was filtered by a needle-less syringe (manufactured by Terumo Corporation) having a capacity of 25 mL and equipped with a filter having a thickness of 5 μm (acetyl cellulose film having an outside diameter of 2.5 cm, manufactured by Fuji Photo Film Co., Ltd.) to remove coarse particles, thereby obtaining an water dispersion (25% by mass in a solid content).

TABLE 2

| | Polymer produced in Production Example | Pigment | |
|---|---|---|---|
| Preparation Example 1 | Production Example 1 | Carbon black NIPEX 150 | manufactured by Degussa GmbH |
| Preparation Example 2 | Production Example 2 | C.I. Pigment Yellow 74 | manufactured by Dainichiseika Color & Chemicals Mfg. Co., Ltd. |
| Preparation Example 3 | Production Example 3 | C.I. Pigment Red 122 | manufactured by Dainichiseika Color & Chemicals Mfg. Co., Ltd. |
| Preparation Example 4 | Production Example 4 | C.I. Pigment Blue 15:3 | manufactured by Dainichiseika Color & Chemicals Mfg. Co., Ltd. |
| Preparation Example 5 | Production Example 5 | Carbon black NIPEX 150 | manufactured by Degussa GmbH |
| Preparation Example 6 | Production Example 6 | Carbon black NIPEX 150 | manufactured by Degussa GmbH |
| Preparation Example 7 | Production Example 6 | C.I. Pigment Red 122 | manufactured by Dainichiseika Color & Chemicals Mfg. Co., Ltd. |
| Preparation Example 8 | Production Example 6 | C.I. Pigment Blue 15:3 | manufactured by Dainichiseika Color & Chemicals Mfg. Co., Ltd. |

Examples 1 to 7 and Comparative Examples 1 to 6

—Production of Inkjet Ink—

Each inkjet ink was produced as follows: first, a water-soluble organic solvent, a penetrating agent, a surfactant, an antifungal agent, an antifoaming agent, a pH adjuster, and water shown in Tables 3 and 4 were mixed and stirred for 1 hour so as to obtain a uniformly mixed liquid. In the mixed liquid, a water dispersible resin was added and stirred for 1 hour, and then a pigment dispersion was added and stirred for 1 hour. The dispersion liquid was filtrated under pressure through a polyvinylidene fluoride membrane filter having an average pore diameter of 5.0 μm so as to remove coarse particles, thereby obtaining each of inkjet inks of Examples 1 to 7 and Comparative Examples 1 to 6.

TABLE 3

| | Component (% by mass) | Ex. 1 | Ex. 2 | Ex. 3 | Ex. 4 | Ex. 5 | Ex. 6 | Ex. 7 |
|---|---|---|---|---|---|---|---|---|
| Pigment dispersion | Preparation Example 1(Carbon black NIPEX 150) | 42.9 | — | — | — | — | — | — |
| | Preparation Example 2 (C.I. Pigment Yellow 74) | — | 28.6 | — | — | — | — | — |
| | Preparation Example 3 (C.I. Pigment Red 122) | — | — | 40.0 | — | — | — | — |
| | Preparation Example 4 (C.I. Pigment Blue 15:3) | — | — | — | 28.6 | — | — | — |
| | Preparation Example 5 (Carbon black NIPEX 150) | — | — | — | — | 45.7 | — | — |
| | Preparation Example 6 (Carbon black NIPEX 150) | — | — | — | — | — | — | — |
| | Preparation Example 7 (C.I. Pigment Red 122) | — | — | — | — | — | 45.7 | — |
| | Preparation Example 8 (C.I. Pigment Blue 15:3) | — | — | — | — | — | — | 28.6 |
| | Self-dispersible pigment dispersion (1) CAB-O-JET#300 | — | — | — | — | — | — | — |
| | Self-dispersible pigment dispersion (2) CAB-O-JET#260m | — | — | — | — | — | — | — |
| Water-dispersible resin | Fluorine resin emulsion | — | — | — | — | — | — | — |
| Wetting agent | 1,3-butanediol | — | 26.0 | 22.0 | 27.0 | — | 21.6 | 25.3 |
| | 3-methyl-1,3-butanediol | 17.0 | — | — | — | 16.5 | — | — |
| | propylene glycol | — | — | — | — | — | — | — |
| | 1,2,4-butanetriol | — | — | 5 | — | 3.5 | — | — |
| | glycerin | 17.0 | 13.0 | 10.0 | 13.5 | 13.0 | 14.4 | 12.7 |
| | 2-{2-(2-butoxyethoxy)-ethoxy}ethanol | — | — | — | — | — | — | — |
| Penetrating agent | 2-ethyl-1,3-hexanediol | 2.0 | 2.0 | 2.0 | 2.0 | 2.0 | 2.0 | 2.0 |
| Surfactant | ZONYL FS-300 | 2.5 | 2.5 | — | — | 1.5 | 2.5 | 2.5 |
| | OLFINE EXP4001 | — | — | 1.0 | 1.0 | — | — | — |
| | SOFTANOL EP-7025 | — | — | — | — | — | — | — |
| Antifungal Agent | PROXEL GXL | 0.05 | 0.05 | 0.05 | 0.05 | 0.05 | 0.05 | 0.05 |
| Antifoaming agent | Silicone antifoaming agent KM-72F | 0.05 | 0.05 | 0.05 | 0.05 | 0.1 | 0.05 | 0.05 |
| pH adjuster | 2-amino-2-ethyl-1,3-propanediol | 0.3 | 0.4 | 0.2 | 0.2 | 0.3 | 0.3 | 0.2 |
| | Pure water | balance | balance | balance | balance | balance | balance | balance |
| | Total (% by mass) | 100 | 100 | 100 | 100 | 100 | 100 | 100 |

TABLE 4

| | Component (% by mass) | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Pigment dispersion | Preparation Example 1 (Carbon black NIPEX | — | — | — | — | — | 36.6 |
| | Preparation Example 2 (C.I. Pigment Yellow 74) | — | — | — | — | — | — |
| | Preparation Example 3 (C.I. Pigment Red 122) | — | — | — | — | — | — |
| | Preparation Example 4 (C.I. Pigment Blue 15:3) | — | — | — | — | — | — |
| | Preparation Example 5 (Carbon black NIPEX | — | — | — | — | — | — |
| | Preparation Example 6 (Carbon black NIPEX | 45.7 | — | — | — | — | — |
| | Preparation Example 7 (C.I. Pigment Red 122) | — | — | — | — | — | — |
| | Preparation Example 8 (C.I. Pigment Blue 15:3) | — | — | — | 28.6 | — | — |
| | Self-dispersible pigment dispersion (1) CAB-O-JET#300 | — | 50.0 | — | — | 43.3 | — |
| | Self-dispersible pigment dispersion (2) CAB-O-JET#260m | — | — | 46.7 | — | — | — |
| Water-dispersible resin | Fluorine resin emulsion | — | 10.0 | 7.0 | 8.0 | — | — |
| Wetting agent | 1,3-butanediol | — | — | 25.5 | 25.5 | 15.0 | — |
| | 3-methyl-1,3-butanediol | 25.0 | 15.0 | — | — | — | — |
| | propylene glycol | — | 10.0 | — | — | — | — |
| | 1,2,4-butanetriol | — | 5 | — | — | — | — |
| | glycerin | 10.0 | — | 8.5 | 8.5 | 15.0 | 15.0 |
| | 2-{2-(2-butoxyethoxy)-ethoxy}ethanol | — | — | — | — | — | 5.0 |
| Penetrating agent | 2-ethyl-1,3-hexanediol | 2.0 | 2.0 | — | 2.0 | 1.0 | — |
| Surfactant | ZONYL FS-300 | 1.5 | — | — | 2.5 | — | — |
| | OLFINE EXP4001 | — | 1.0 | — | — | — | 1.0 |
| | SOFTANOL EP-7025 | 1.0 | — | 0.5 | — | 1.0 | — |
| Antifungal Agent | PROXEL GXL | 0.05 | 0.05 | 0.05 | 0.05 | 0.05 | 0.05 |
| Antifoaming agent | Silicone antifoaming agent KM-72F | 0.1 | 0.1 | 0.1 | 0.05 | 0.05 | 0.1 |
| pH adjuster | 2-amino-2-ethyl-1,3-propanediol | 0 | 0.5 | 0.3 | 0.2 | 0 | 0.3 |
| | Pure water | balance | balance | balance | balance | balance | balance |
| | Total (% by mass) | 100 | 100 | 100 | 100 | 100 | 100 |

The units in Tables 3 and 4 are parts by mass. The abbreviations in Tables 3 and 4 mean as follows:

Self-dispersible pigment dispersion (1): CAB-O-JET#300, a solid content of 15% by mass, manufactured by CABOT Self-dispersible pigment dispersion (2): CAB-O-JET#260m, a solid content of 15% by mass, manufactured by CABOT Fluorine resin emulsion: LUMIFLON FE4500, a solid content of 50% by mass, an average particle diameter of 136 nm, a minimum film-forming temperature (MFT)=28° C., manufactured by Asahi Glass Co., Ltd.

ZONYL FS-300: polyoxyethylene perfluoroalkyl ether, a component of 40% by mass, manufactured by DuPont OLFINE EXP4001: acetylene glycol surfactant, a component of 80% by mass, manufactured by Nissin Chemical Industry Co., Ltd.

SOFTANOL EP-7025: polyoxyalkylene alkyl ether, a component of 100% by mass, manufactured by NIPPON SHOKUBAI CO., LTD.

PROXEL GXL: an antifungal agent mainly containing 1,2-benzisothiazolin-3-one, a component of 20% by mass, containing dipropylene glycol, manufactured by Avecia Co.

KM-72F: a self-emulsifiable silicone antifoaming agent, a component of 100% by mass, manufactured by Shin-Etsu Silicones Co. Ltd.

Next, each of the inkjet inks of Examples 1 to 7 and Comparative Examples 1 to 6 was evaluated on the following evaluation method. The results are shown in Tables 5 and 6.

<Solid Content Concentration>

The total amount of the pigment and the resin in the ink (a coating resin or a water dispersible resin) was calculated.

<Viscosity>

The viscosity of the ink was measured at 25° C. using a viscometer RE-550L (manufactured by Toki Sangyo Co., Ltd., with a cone rotor 1° 34'×R24). While the pH of the ink was measured using a pH meter HM-30R (manufactured by TOA-DKK CORPORATION), 1N hydrochloric acid was dripped in the ink so as to produce a neutralized product of ink, the pH of which was adjusted to 7, and the viscosity of the neutralized product of ink was measured at 25° C. using the viscometer. Further, by the following method, the ink was left to stand at a temperature of 25° C. and a humidity of 15% until substantially no mass change occurred so as to obtain a dried ink residue. The viscosity of the dried ink residue was measured at 25° C. using the viscometer RE-550L.

[Dried Ink Residue]

In a glass petri dish having a diameter of 33 mm, 2.5 g of each of the inkjet inks of Examples and Comparative Examples, measured using a precision electronic scale balance capable of measuring weight down to four places of decimals, was placed. Then it was stored under normal pressure in a constant temperature bath (ModelPL-3 KP) (manufactured by ESPEC Corp.) having a temperature of 25° C.±0.5° C. and a humidity of 15%±5%. The samples were respectively taken out and the mass thereof was measured every 1 hour, and the samples were stored until the mass change per 1 hour became 1% or less with respect to the total mass of the ink. After the storage, the ink residue was weighed using a precision electronic scale balance, and the evaporation rate of a solvent was calculated by means of the following Equation. Subsequently, the viscosity of this ink residue was measured at 25° C. using an RE-550L viscometer (manufactured by Toki Sangyo Co., Ltd.) with a cone rotor 3°×R14.

Evaporation rate of solvent(% by mass)=(1−mass of ink residue/total mass of ink)×100 where the solvent represents water and water-soluble organic solvent in the ink.

<Average Particle Diameter>

The average particle diameter (D50) of the ink or the dried ink, which was prepared as the above-description, was measured by a particle size distribution measurement device (NANOTRACK UPA-EX150, manufactured by Nikkiso Co. Ltd.).

<Surface Tension>

The surface tension of the ink was measured using an automatic surface tensiometer (CBVP-Z manufactured by Kyowa Interface Science Co., Ltd.) at a temperature of 25° C.

<pH>

The pH of the ink was measured using a pH meter HM-30R (TOA-DKK CORPORATION) at a temperature of 25° C.

TABLE 5

| | Ink Properties | | | | |
|---|---|---|---|---|---|
| | Solid content concentration (%) | Viscosity (mPa·s) | Average particle diameter D50 (nm) | Surface tension (mN/m) | pH |
| Ex. 1 | 10.7 | 8.18 | 95.0 | 24.4 | 9.63 |
| Ex. 2 | 7.2 | 8.12 | 105.4 | 24.6 | 9.44 |
| Ex. 3 | 10.0 | 8.26 | 98.8 | 28.5 | 9.47 |
| Ex. 4 | 7.2 | 8.31 | 86.1 | 28.7 | 9.56 |
| Ex. 5 | 11.4 | 7.98 | 101.5 | 25.1 | 9.66 |
| Ex. 6 | 11.4 | 8.18 | 81.8 | 24.7 | 9.32 |
| Ex. 7 | 7.2 | 8.11 | 130.4 | 24.5 | 9.62 |
| Comp. Ex. 1 | 11.4 | 22.5 | 105.2 | 25.3 | 8.04 |
| Comp. Ex. 2 | 12.5 | 9.25 | 105.4 | 28.9 | 9.35 |
| Comp. Ex. 3 | 10.5 | 8.51 | 88.1 | 36.4 | 9.47 |
| Comp. Ex. 4 | 11.2 | 8.16 | 131.6 | 25.6 | 9.72 |
| Comp. Ex. 5 | 6.5 | 5.84 | 106.3 | 34.8 | 7.94 |
| Comp. Ex. 6 | 9.2 | 3.69 | 97.1 | 29.9 | 8.06 |

TABLE 6

| | pH adjusted ink (pH was adjusted to 7) | | | |
|---|---|---|---|---|
| | Dried ink residue Viscosity (mPa·s) | Average particle diameter (nm) D50 | The ratio of non-pH adjusted ink to pH adjusted ink | Viscosity (mPa·s) |
| Ex. 1 | 905 | 1,066 | 1:11.2 | 1,200,000 |
| Ex. 2 | 599 | 3,360 | 1:31.9 | 1,100 |
| Ex. 3 | 2,104 | 3,210 | 1:32.5 | 1,200,000 |
| Ex. 4 | 864 | 4,670 | 1:54.2 | 900 |
| Ex. 5 | 1,015 | 2,570 | 1:25.3 | 1,200,000 |
| Ex. 6 | 2,850 | 4,060 | 1:49.6 | 1,200,000 |
| Ex. 7 | 1,577 | 4,840 | 1:37.1 | 585 |
| Comp. Ex. 1 | 60,000,000 | 453 | 1:4.3 | 367 |
| Comp. Ex. 2 | 60,000,000 | 206 | 1:2.0 | 19.3 |
| Comp. Ex. 3 | 60,000,000 | 162 | 1:1.8 | 15.7 |
| Comp. Ex. 4 | 4,550 | 3,530 | 1:26.8 | 348 |
| Comp. Ex. 5 | 168 | 108 | 1:1.0 | 5.67 |
| Comp. Ex. 6 | 60,000,000 | 855 | 1:8.8 | 870 |

—Preparation 1 of Printing Evaluation—

In an adjusted environment where the temperature was 25° C.±0.5° C. and the relative humidity was 15%±5%, the drive voltage of a piezoelectric element was changed such that the amount of ink ejected became uniform, using an inkjet printer (IPSIO GX-5000, manufactured by Ricoh Company, Ltd.), in which any of inks of Examples 1 to 7 and Comparative Examples 1 to 6 was set, and settings were made such that the same amount of ink was attached onto each recording medium Type 6200 (high quality paper having a basis weight of 71.7 g/m², a sizing of 20 seconds, and an air permeability of 22.5 seconds, manufactured by NBS Ricoh Co., Ltd.). Under these conditions, ejection stability, ink adhesion in maintenance device, image density, water resistance, light resistance, and drying property were evaluated as follows.

<Ejection Stability>

A chart to be formed by painting 5% in area of A4 size paper with a solid image per color, produced using MICROSOFT WORD 2000, was printed onto sheets of TYPE 6200 (manufactured by NBS Ricoh Co., Ltd.) by five sets, each of which consisted of a succession of 200 charts; and image defect after printing was visually observed so as to evaluate ejection stability on the basis of the following evaluation criteria. As for the printing mode, "Plain Paper—Standard Speed" mode was changed to "No Color Correction" mode in user settings for plain paper by using a driver residing in a printer.

[Evaluation Criteria]
A: No ejection nonuniformity (No image defect) was observed.
B: Ejection nonuniformity (image defect) was slightly observed.
C: Ejection nonuniformity was observed or there were parts where no ejection took place, i.e. image defect was observed or there were parts where no image was printed.

<Ink Adhesion in Maintenance Device>

In an adjusted environment where the temperature was 28° C.±0.5° C. and the relative humidity was 15%±5%, the drive voltage of a piezoelectric element was changed such that the amount of ink ejected became uniform, using an inkjet printer (IPSIO GX-5000, manufactured by Ricoh Company, Ltd.), and then head cleaning operation was continuously conducted ten times every one hour. This head cleaning operation was conducted a total of 100 times in 10 hours, and left to stand for 12 hours, then ink adhesion in a wiper section and a wiper cleaner section of the maintenance device was visually observed.

[Evaluation Criteria]
A: No ink adhesion was observed.
B: Ink adhesion was slightly observed.
C: Ink adhesion was observed.

<Image Density>

A chart including a 64-point character "■", each of which is in a color of black, yellow, magenta and cyan, produced using MICROSOFT WORD 2000, was printed onto recording media TYPE 6200 (manufactured by NBS Ricoh Co., Ltd.), and the color of the "■" portions on printing surfaces were measured by means of the densitometer X-Rite 938 and judged according to the following evaluation criteria. As for the printing mode, "Plain Paper—Standard Speed" mode was changed to "No Color Correction" mode in user settings for plain paper by using a driver residing in a printer.

[Evaluation Criteria]
A: 1.3 or greater with respect to black,
0.85 or greater with respect to yellow,
1.05 or greater with respect to magenta,
1.1 or greater with respect to cyan
B: 1.2 or greater and less than 1.3 with respect to black,
0.8 or greater and less than 0.85 with respect to yellow,
1.0 or greater and less than 1.05 with respect to magenta,
1.0 or greater and less than 1.1 with respect to cyan
C: 1.15 or greater and less than 1.2 with respect to black,
0.75 or greater and less than 0.8 with respect to yellow,
0.95 or greater and less than 1.0 with respect to magenta,
0.95 or greater and less than 1.0 with respect to cyan
D: less than 1.15 with respect to black,
0.75 with respect to yellow,
less than 0.95 with respect to magenta,
less than 0.95 with respect to cyan <Water Resistance>

A chart was printed onto the recording media TYPE 6200 similarly to the case of Image Density, and "■" portions printed on printing surfaces were dried for 24 hours at a temperature of 23° C. and a relative humidity of 50%. Subsequently, each chart was immersed for 1 min. in water having a temperature of 30° C. and then carefully raised so as to undergo drying while standing still, and judgments were made on the basis of the following evaluation criteria.

[Evaluation Criteria]
A: No color bleeding was observed.
B: Color bleeding was observed.

<Light Resistance>

A chart was printed onto the recording media TYPE 6200 similarly to the case of Image Density, and "■" portions printed on printing surfaces were dried for 24 hours at a temperature of 23° C. and a relative humidity of 50%. These image portions were irradiated with xenon light approximating to outdoor sunlight at an irradiance of 0.35 W/m$^2$ (340 nm) for 24 hours in an environment where the temperature was 70° C., the relative humidity was 50% and the black panel temperature was 89° C., using WEATHER-OMETER Ci35AW manufactured by Atlas Material Testing Technology LLC, and color fading and color change caused by the irradiation were judged on the basis of the following evaluation criteria.

[Evaluation Criteria]
A: Almost no change was observed.
B: Change was observed but acceptable.
C: Great color fading and color change were observed.

<Drying Property>

A chart was printed onto the recording media TYPE 6200 similarly to the case of Image Density, and filter paper was pressed against "■" portions printed on printing surfaces immediately after the printing so as to judge the presence/absence of transfer.

[Evaluation Criteria]
A: No transfer smear was observed.
B: Transfer smear was slightly observed.
C: Transfer smear was observed.

<Storage Stability of Ink>

By using a viscometer RE-550L (manufactured by Toki Sangyo Co., Ltd., with a cone rotor 1° 34'×R24) the viscosity before storage and the viscosity after storage in a hermetically-closed container at 70° C. for 14 days of each of the inkjet ink prepared in Examples 1 to 7 and Comparative Examples 1 to 6 were measured, and then the storage stability thereof was calculated in accordance with the following equation, and evaluated on the basis of the following evaluation criteria.

Storage stability(%)=(Viscosity after storage)/(Viscosity before storage)×100

[Evaluation Criteria]
A: In a rage of 100%±10%
B: 100%±10% or greater to less than 100%±20%
C: 100%±20% or greater Evaluation results are shown in Table 7. Evaluation was performed on each color based of the evaluation criteria. Thus, the most common evaluation was defined as the judged evaluation result of the image quality and shown in each Table. In the case where the number of judgments was the same in different criteria, better judgment is shown in each Table.

TABLE 7

| | Image Evaluation | | | | | | Ink property changing over time |
|---|---|---|---|---|---|---|---|
| | Ejection stability | Ink adhesion in maintenance device | Image density | Water resistance | Light resistance | Drying property | Storage stability |
| Ex. 1 | A | A | B | A | A | A | A |
| Ex. 2 | A | A | B | A | A | A | A |
| Ex. 3 | A | A | B | A | A | A | A |
| Ex. 4 | A | A | B | A | A | A | A |
| Ex. 5 | A | A | B | A | A | A | A |
| Ex. 6 | B | B | B | A | A | A | A |
| Ex. 7 | B | A | C | A | A | A | A |
| Comp. Ex. 1 | B | C | D | A | A | A | C |
| Comp. Ex. 2 | C | C | C | A | A | A | B |
| Comp. Ex. 3 | C | B | C | A | A | C | B |
| Comp. Ex. 4 | B | C | C | A | A | A | A |
| Comp. Ex. 5 | A | B | D | B | A | B | A |
| Comp. Ex. 6 | B | C | C | A | A | A | A |

Preparation Examples 9 to 15

—Preparation of Pretreatment Liquid—

Each of the pretreatment liquids was prepared as follows: at first, raw materials of a pretreatment liquid shown in Table 8 were mixed and stirred for 1 hour so as to be uniformly mixed. This pretreatment liquid was subjected to pressure filtration by using a polyvinylidene fluoride membrane filter having an average pore size of 5.0 so as to remove coarse particles and contaminant, thereby preparing each of pretreatment liquids of Preparation Examples 9 to 15.

TABLE 8

| | | Preparation Examples | | | | | | |
|---|---|---|---|---|---|---|---|---|
| Component (% by mass) | | 9 | 10 | 11 | 12 | 13 | 14 | 15 |
| Cationic organic compound | SHALLOL DC-902P | 20.0 | 20.0 | — | — | — | — | — |
| | POLYMARON 360 | — | — | 50.0 | — | — | — | — |
| Organic acid | citric acid | — | — | — | 10.0 | — | — | — |
| | lactic acid | — | — | — | — | 10.0 | — | — |
| Metal salt compound | calcium chloride | — | — | — | — | — | 10.0 | — |
| | sodium nitrate | — | — | — | — | — | — | 10.0 |
| Wetting agent | 1,3-butanediol | 5.0 | 5.0 | 5.0 | 5.0 | 5.0 | — | — |
| | glycerin | 10.0 | 10.0 | 10.0 | 10.0 | 10.0 | 15.0 | 15.0 |
| Penetrating agent | 2-ethyl-1,3-hexanediol | 1.0 | 1.0 | 1.0 | 1.0 | 1.0 | 1.0 | 1.0 |
| Surfactant | ZONYL FS-300 | — | — | — | 1.0 | — | 1.0 | — |
| | KF-643 | — | — | 0.4 | — | 0.4 | — | 0.4 |
| Antifungal Agent | PROXEL GXL | 0.050 | 0.050 | 0.050 | 0.050 | 0.050 | 0.050 | 0.050 |
| | Pure water | balance | balance | balance | balance | balance | balance | balance |
| Total (% by mass) | | 100 | 100 | 100 | 100 | 100 | 100 | 100 |

The abbreviations in Table 8 means as follows:

SHALLOL DC-902P: a cationic polymer compound of dialkyl diallyl-quaternary ammonium salt, a solid content of 50% by mass, pH 3 to pH 5, manufactured by Dai-ichi Kogyo Seiyaku Co., Ltd.

POLYMARON 360: a cationic polymer compound, a solid content of 20% by mass, pH 4.5 to pH 5.5, a styrene maleic acid copolymer, manufactured by Arakawa Chemical Industries, Ltd.

ZONYL FS-300: polyoxyethylene perfluoroalkyl ether, a component of 40% by mass, manufactured by DuPont KF-643: polyether-modified silicone surfactant, a component of 100% by mass, manufactured by Shin-Etsu Chemical Co., Ltd.

PROXEL GXL: an antifungal agent mainly containing 1,2-benzisothiazolin-3-one, a component of 20% by mass, containing dipropylene glycol, manufactured by Avecia Co.

The measurement results of static surface tensions of the pretreatment liquids of Preparation Examples 9 to 15 were as follows:

Preparation Example 9: 37.7 mN/m
Preparation Example 10: 23.7 mN/m
Preparation Example 11: 22.5 mN/m
Preparation Example 12: 23.5 mN/m
Preparation Example 13: 22.4 mN/m
Preparation Example 14: 23.8 mN/m
Preparation Example 15: 22.7 mN/m Examples 8 to 17 and Comparative Examples 7 to 12

On a recording medium Type 6200 (high quality paper having a basis weight of 71.7 g/m$^2$, a sizing of 20 seconds, and an air permeability of 22.5 seconds, manufactured by NBS Ricoh Co., Ltd.), each of the pretreatment liquids of Preparation Examples 9 to 15 shown in Table 9 was applied by a wire bar coating method and dried with warm air, or was applied by the apparatus shown in FIG. 9 or FIG. 10 and natural dried, so as to subject the recording medium to pretreatment.

TABLE 9

| | | Pretreatment step | | | Ink jetting step |
|---|---|---|---|---|---|
| | Recording medium | Pretreatment liquid | Coated amount (dry basis) | Drying method | Ink |
| Ex. 8 | Type 6200 | Preparation Example 9 | 1.6 g/m$^2$ | Warm-air drying | Ex. 1 |
| Ex. 9 | Type 6200 | Preparation Example 10 | 1.6 g/m$^2$ | Warm-air drying | Ex. 1 |
| Ex. 10 | Type 6200 | Preparation Example 11 | 1.6 g/m$^2$ | Warm-air drying | Ex. 2 |
| Ex. 11 | Type 6200 | Preparation Example 12 | 0.4 g/m$^2$ | Natural drying | Ex. 3 |
| Ex. 12 | Type 6200 | Preparation Example 13 | 0.4 g/m$^2$ | Natural drying | Ex. 4 |
| Ex. 13 | Type 6200 | Preparation Example 14 | 2.4 g/m$^2$ | Natural drying | Ex. 5 |
| Ex. 14 | Type 6200 | Preparation Example 15 | 2.4 g/m$^2$ | Natural drying | Ex. 6 |
| Ex. 15 | Type 6200 | Preparation Example 10 | 1.6 g/m$^2$ | Natural drying | Ex. 7 |
| Ex. 16 | Type 6200 | Preparation Example 12 | 0.09 g/m$^2$ | Warm-air drying | Ex. 7 |
| Ex. 17 | Type 6200 | — | — | — | Ex. 7 |
| Comp. Ex. 7 | Type 6200 | Preparation Example 10 | 1.6 g/m$^2$ | Warm-air drying | Comp. Ex. 1 |
| Comp. Ex. 8 | Type 6200 | Preparation Example 11 | 1.6 g/m$^2$ | Warm-air drying | Comp. Ex. 2 |
| Comp. Ex. 9 | Type 6200 | Preparation Example 12 | 0.4 g/m$^2$ | Natural drying | Comp. Ex. 3 |
| Comp. Ex. 10 | Type 6200 | Preparation Example 13 | 0.4 g/m$^2$ | Natural drying | Comp. Ex. 4 |
| Comp. Ex. 11 | Type 6200 | Preparation Example 14 | 2.4 g/m$^2$ | Natural drying | Comp. Ex. 5 |
| Comp. Ex. 12 | Type 6200 | Preparation Example 15 | 2.4 g/m$^2$ | Natural drying | Comp. Ex. 6 |

—Preparation 2 of Printing Evaluation—

In an adjusted environment where the temperature was 23° C.±0.5° C. and the relative humidity was 50%±5%, the drive voltage of a piezoelectric element was changed such that the amount of ink ejected became uniform, using an inkjet printer (IPSIO GX-5000, manufactured by Ricoh Company, Ltd.), in which any of inks of Examples 1 to 7 and Comparative Examples 1 to 6 was set, and settings were made such that the same amount of ink was attached onto each recording medium which had been subjected to pretreatment. Under these conditions, image density, color saturation, feathering, white spots, smear adhesion, and storage stability were evaluated as follows.

<Image Density>

Image density of each of Examples 8 to 17 and Comparative Examples 7 to 12 was evaluated in the same manner as in Examples 1 to 7 and Comparative Examples 1 to 6, except that the a recording medium which had been subjected to pretreatment with each of the pretreatment liquids prepared in Preparation Examples 9 to 15 was used instead of the recording medium of high quality paper Type 6200 (manufactured by NBS Ricoh Co., Ltd.) in the evaluation of Image Density in Examples 1 to 7 and Comparative Examples 1 to 6.

<Color Saturation>

A chart was printed onto the recording media similarly to the case of Image Density, and "■" portions printed on printing surfaces were measured using X-Rite 938 so as to evaluate on the basis of the following evaluation criteria. The printing was performed in "Plain Paper—Standard Speed" mode by using a driver residing in a printer.

The ratio of measured color saturation to that of the standard color (Japan color ver.2, yellow: 91.34, magenta: 74.55, cyan: 62.82) was calculated to evaluate the color saturation on the basis of the following evaluation criteria.

[Evaluation Criteria]
A: 0.85 or greater
B: 0.80 or greater to less than 0.85
C: 0.75 or greater to less than 0.80
D: less than 0.75

<Feathering>

A chart including 6 point symbol "轟" in Kanji, produced using MICROSOFT WORD 2000, was printed on the recording media, and then visually observed to determine whether feathering occurred.

[Evaluation Criteria]
A: No problem occurred.
B: Feathering slightly occurred but no problem occurred.
C: Some feathering occurred and a problem occurred.
D: Feathering occurred and a problem occurred.

<White Spots>

A chart including a 64 point character "■" produced using MICROSOFT WORD 2000 was printed on the recording media, and then the solid images "■" of yellow, magenta, cyan and black on the print surfaces were visually observed to determine whether white spots generated.

[Evaluation Criteria]
A: No problem occurred.
B: White spots were slightly present but no problem occurred.
C: White spots generated but were allowable.
D: White spots generated and a problem occurred.

<Smear Adhesion>

A chart including a solid image of 3 cm squares produced using MICROSOFT WORD 2000 was printed on the recording media, and then dried at a temperature of 23° C.±1° C. and a relative humidity of 50%±10% for 5 min. The solid image "■" on the printing surfaces were rubbed back and forth 10 times with cotton No. 3 (conforming to JIS L0803 standard) attached to a CM-1 clock meter using a double-faced adhesive. The amount of transferred ink from the solid image to that cotton was measured using X-Rite 938. The original color of that cotton was eliminated for obtaining the density. Based on the measured amount, the density of the transferred ink on the cotton was obtained and evaluated using the following evaluation criteria.

[Evaluation Criteria]
A: less than 0.03
B: 0.03 or greater to less than 0.07
C: 0.07 or greater to less than 0.10
D: 0.10 or greater

TABLE 10

| | Image Evaluation | | | | | | | |
|---|---|---|---|---|---|---|---|---|
| | Ejection stability | Ink adhesion in maintenance device | Image density | Color saturation | Feathering | White spots | Smear adhesion | Ink property changing over time Storage stability |
| Ex. 8 | A | A | A | — | A | B | B | A |
| Ex. 9 | A | A | A | — | A | A | B | A |
| Ex. 10 | A | A | A | A | A | A | B | A |
| Ex. 11 | A | A | A | A | A | A | B | A |
| Ex. 12 | A | A | A | A | A | A | B | A |
| Ex. 13 | A | A | A | — | A | A | B | A |
| Ex. 14 | B | B | A | — | B | A | B | A |
| Ex. 15 | B | A | A | B | B | B | B | A |
| Ex. 16 | B | A | B | C | B | B | A | A |
| Ex. 17 | B | A | C | C | B | C | A | A |
| Comp. Ex. 7 | B | C | B | — | B | B | B | C |
| Comp. Ex. 8 | C | C | C | — | C | B | B | B |
| Comp. Ex. 9 | C | B | D | C | C | D | B | B |
| Comp. Ex. 10 | B | C | B | B | B | C | B | A |
| Comp. Ex. 11 | A | B | B | — | C | B | D | A |
| Comp. Ex. 12 | C | C | A | — | B | B | B | A |

INDUSTRIAL APPLICABILITY

An inkjet ink, ink cartridge, inkjet recording apparatus, inkjet recording method, and image forming apparatus of the present invention can be suitably applied to inkjet recording printers, facsimile apparatuses, copiers, printer/fax/copier complex machines, and so forth.

REFERENCE SIGNS LIST 61 frame
62 cap holder
62A cap holder
62B cap holder
65 carriage lock
67 carriage lock arm
68 wiper cleaner
69 flexible tube
71 motor
71a motor shaft
72 motor gear
73 pump gear
74 intermediate gear
75 intermediate gear
76 intermediate gear
77 one-way clutch
78 intermediate gear
79 intermediate gear
80 cam gear
81 intermediate shaft
82 home position sensor cam
91 subsystem
92 cap
92a suction cap
92b cap
92c cap
92d cap
93 wiper blade
94 idle ejection receiver
95 wiper cleaner
96 cleaner roller
101 apparatus main body
102 paper feed tray
103 paper discharge tray
104 ink cartridge loading section
105 operation unit
111 upper cover
112 front surface
115 front cover
120 tubing pump
120a pump shaft
121 cam shaft
122A cap cam
122B cap cam
124 wiper cam
125 carriage lock cam
126 idle ejection target member (rotating body)
128 cleaner cam
131 guide rod
132 stay
133 carriage
134 recording head
135 sub-tank
141 paper loading section
142 paper
143 paper feed roller
144 separation pad
145 guide
151 conveyance belt
152 counter roller
153 conveyance guide
154 pressing member
155 end pressurizing roller
156 charging roller
157 conveyance roller
158 tension roller
161 guide member
171 separation pawl
172 paper discharge roller
173 paper discharge roller
181 double-sided paper feed unit
182 manual paper feed unit
201 ink cartridge
241 ink bag
242 ink inlet
243 ink ejection outlet
244 cartridge case
301 pretreatment liquid
302 thickness controlling roller
303 drawing roller 304 applicator roller
305 counter roller
306 recording medium
307 paper feed roller
308 paper feed tray
310 paper feed roller
311 recording medium feed roller
312 recording medium feed roller
313 recording medium feed roller
314 recording medium feed roller
315 recording medium feed roller
316 recording medium feed roller
317 recording medium
318 paper feed roller
320 recording head
321 ink cartridge
322 carriage axis
323 carriage
331 recording medium guide
332 recording medium feed roller
333 recording medium feed roller
334 guide for return
335 paper feed guide
R printing area
X scanning direction of carriage
Y feeding direction of paper on the belt

The invention claimed is:
1. An inkjet ink, comprising:
a water dispersion of at least one pigment-containing water-insoluble vinyl polymer particle;
a water-soluble organic solvent; and
water,
wherein
an ink residue from the inkjet ink has a viscosity of 3,000 mPa·s or less,
the ink residue is obtained by leaving the inkjet ink to stand at a temperature of 25° C. and
a humidity of 15% until substantially no mass change occurs, and
wherein the inkjet ink of which pH is adjusted to 7 with an acid has a viscosity of 500 mPa·s or more.
2. The inkjet ink according to claim 1, wherein the water-insoluble vinyl polymer is obtained by polymerizing a monomer mixture comprising:
(A) a monomer expressed by Formula (1),

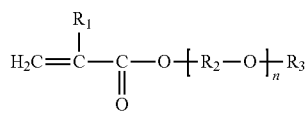
(1)

wherein $R_1$ represents a hydrogen atom or a methyl group;
$R_2$ represents an alkylene group having 2 to 8 carbon atoms or an alkylene group having 2 to 4 carbon atoms in which a hydrogen atom is substituted with a phenyl group;
n represents an integer of 2 to 30; and
$R_3$ represents a straight-chain or branched chain alkyl group having 2 to 30 carbon atoms;
(B) a monomer containing salt-forming group; and
(C) a hydrophobic monomer.
3. The inkjet ink according to claim 2, wherein the hydrophobic monomer comprises at least one selected from the group consisting of (C-1), (C-2), and (C-3),
wherein
the (C-1) is a monomer expressed by Formula (2),

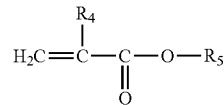
(2)

wherein $R_4$ represents a hydrogen atom or a methyl group; and
$R_5$ represents an alkyl group having 1 to 22 carbon atoms, an aryl, alkylaryl or arylalkyl group having 6 to 22 carbon atoms or a cyclic hydrocarbon group having 3 to 22 carbon atoms;
the (C-2) is a monomer expressed by Formula (3),

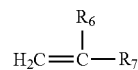
(3)

where wherein $R_6$ represents a hydrogen atom or a methyl group; and
$R_7$ represents a substituted or unsubstituted phenyl, biphenyl or naphthalene group; and
the (C-3) is a macromer.
4. The inkjet ink according to claim 1, wherein the inkjet ink comprises at least one polyhydric alcohol having an equilibrium water content of 30% by mass or more at a temperature of 23° C. and a humidity of 80%.
5. The inkjet ink according to claim 4, wherein the polyhydric alcohol is selected from the group consisting of glycerin and 1,3-butanediol.
6. The inkjet ink according to claim 1, wherein the inkjet ink comprises one of a polyol compound having 8 to 11 carbon atoms and a glycol ether compound having 8 to 11 carbon atoms.
7. The inkjet ink according to claim 6, wherein the polyol compound having 8 to 11 carbon atoms comprises one of 2-ethyl-1,3-hexanediol, and 2,2,4-trimethyl-1,3-pentanediol.
8. The inkjet ink according to claim 1, wherein the inkjet ink has
a viscosity at 25° C. of 5 mPa·s to 20 mPa·s,
a static surface tension of 35 mN/m or less, and
a pH of 8.5 or more.
9. The inkjet ink according to claim 1, wherein an average particle diameter of the pH adjusted ink is five times or greater than an average particle diameter of the ink of which pH is not adjusted.
10. An image forming method, comprising:
applying a pretreatment liquid to a recording medium; and
applying a stimulus to an inkjet ink so as to jet the inkjet ink, thereby forming an image onto the recording medium coated with the pretreatment liquid,
wherein the pretreatment liquid comprises:
at least one selected from the group consisting of
a cationic organic compound,
a water-soluble organic acid, and
a water-soluble metal salt compound;
a water-soluble organic solvent; and
water,
wherein the inkjet ink comprises:
a water dispersion of at least one pigment-containing water-insoluble vinyl polymer particle;

a water-soluble organic solvent; and
water,
wherein
an ink residue from the inkjet ink has a viscosity of 3,000 mPa·s or less,
the ink residue is obtained by leaving the inkjet ink to stand at a temperature of 25° C. and a humidity of 15% until substantially no mass change occurs, and
wherein the inkjet ink of which pH is adjusted to 7 with an acid has a viscosity of 500 mPa·s or more.

11. The image forming method according to claim 10, wherein the pretreatment liquid is applied to the recording medium so that a coated amount is 0.1 g/m$^2$ to 10 g/m$^2$ on a dry basis.

12. The image forming method according to claim 10, wherein the pretreatment liquid comprises at least one of a fluorine surfactant and a silicone surfactant.

13. An inkjet recording apparatus, comprising:
an ink jetting unit configured to apply a stimulus to an inkjet ink so as to jet the inkjet ink, thereby forming an image onto a recording medium,
wherein the inkjet ink comprises:
a water dispersion of at least one pigment-containing water-insoluble vinyl polymer particle;
a water-soluble organic solvent; and
water,
wherein
an ink residue from the inkjet ink has a viscosity of 3,000 mPa·s or less,
the ink residue is obtained by leaving the inkjet ink to stand at a temperature of 25° C. and a humidity of 15% until substantially no mass change occurs, and
wherein the inkjet ink of which pH is adjusted to 7 with an acid has a viscosity of 500 mPa·s or more.

* * * * *

UNITED STATES PATENT AND TRADEMARK OFFICE
CERTIFICATE OF CORRECTION

PATENT NO. : 8,382,271 B2
APPLICATION NO. : 13/062232
DATED : February 26, 2013
INVENTOR(S) : Hiroshi Goto et al.

It is certified that error appears in the above-identified patent and that said Letters Patent is hereby corrected as shown below:

On the title page, Item (86), the PCT information is incorrect. Item (86) should read:
--(86) PCT No.: PCT/JP2009/065621

§ 371 (c) (1),
(2), (4) Date: Mar. 4, 2011--

Signed and Sealed this
Twentieth Day of August, 2013

Teresa Stanek Rea
*Acting Director of the United States Patent and Trademark Office*